(12) United States Patent
Beykpour et al.

(10) Patent No.: US 9,148,471 B2
(45) Date of Patent: *Sep. 29, 2015

(54) FORMAT GENERALIZATION OF INSTITUTIONAL CONTENT FOR MOBILE DELIVERY

(75) Inventors: Kayvon Beykpour, Mill Valley, CA (US); Aaron Wasserman, Mill Valley, CA (US); Ben Cunningham, Tallahassee, FL (US); Pablo Jablonski, Buenos Aires (AR); Joseph Bernstein, Mill Valley, CA (US); Nils Rocine, San Francisco, CA (US)

(73) Assignee: BLACKBOARD INC., Washington, DC (US)

( * ) Notice: Subject to any disclaimer, the term of this patent is extended or adjusted under 35 U.S.C. 154(b) by 400 days.

This patent is subject to a terminal disclaimer.

(21) Appl. No.: 12/572,238

(22) Filed: Oct. 1, 2009

(65) Prior Publication Data

US 2011/0082913 A1    Apr. 7, 2011

(51) Int. Cl.
| | | |
|---|---|---|
| *G06F 15/16* | (2006.01) | |
| *H04L 29/08* | (2006.01) | |
| *G06F 17/27* | (2006.01) | |
| *G09B 7/00* | (2006.01) | |
| *G06F 17/30* | (2006.01) | |

(52) U.S. Cl.
CPC ............ *H04L 67/06* (2013.01); *G06F 17/2705* (2013.01); *G09B 7/00* (2013.01); *G06F 17/30011* (2013.01); *G06F 17/3089* (2013.01)

(58) Field of Classification Search
CPC ............ G06F 3/0484; G06F 17/30017; G06F 17/30734; G06F 17/2705; G06F 17/30011; G06F 17/30424
USPC ......................................... 709/219, 216, 217
See application file for complete search history.

(56) References Cited

U.S. PATENT DOCUMENTS

| | | | | |
|---|---|---|---|---|
| 6,301,590 | B1 * | 10/2001 | Siow et al. ..................... 715/234 |
| 2002/0143822 | A1 * | 10/2002 | Brid et al. ..................... 707/522 |
| 2003/0187952 | A1 * | 10/2003 | Young et al. .................. 709/219 |
| 2007/0298401 | A1 * | 12/2007 | Mohanty et al. .............. 434/350 |
| 2009/0177996 | A1 * | 7/2009 | Hunt et al. .................... 715/788 |
| 2009/0193023 | A1 * | 7/2009 | Dzikiewicz et al. ............. 707/6 |
| 2009/0327910 | A1 * | 12/2009 | Black et al. .................. 715/744 |

* cited by examiner

*Primary Examiner* — Djenane Bayard
(74) *Attorney, Agent, or Firm* — McDermott, Will & Emery LLP

(57) ABSTRACT

A system for generalizing the format of instructional content for mobile delivery is disclosed. The system includes a processor configured to identify institutional content in a client-specific data file, and further configured to store, in a memory, the identified institutional content as generalized institutional content. The system also includes a communications module configured to receive, from a mobile device, a request for the generalized institutional content. The processor is configured to provide, to the mobile device in response to the request, the generalized institutional content in a format configured for display on the mobile device. Methods and machine-readable mediums are also disclosed.

19 Claims, 25 Drawing Sheets

330

```
public function update()
{
    $sql = TCSQL::sql();
    $file = 'https://wwwb.is.tcu.edu/iphonedata/buildings.csv';

$handle = fopen($file, "r");
    $line = 0;
    $sql->byPassTransactionSafeQueryCheck = true;

// This white loop iterates through every line in the CSV (sampled above)
    while(($m_array = fgetcsv($handle)) !==false)
    {
        if($line == 0)
        {
            // This is the first line with the name of the fields, we don't need
            $key = array_flip($m_array);
            $line++;
            continue;
        }

// The few lines bellow create an array and set values for the attributes of a building taken from the
        // CSV file sampled aboved
        $mapStructure = array();

//Code,Map Name,Latitude,Longitude,Street,Picture,Descr
        if (isset($m_array[$key['Map Name']]))
        {
            $mapStructure['school_id'] = TCSchool::$school->code;
            if (isset($m_array[$key['Code']]))
                $mapStructure['school_building_id'] = $m_array[$key['Code']];
            $mapStructure['name'] = stripslashes($m_array[$key['Map Name']]);
            $mapStructure['lat'] = $m_array[$key['Latitude']];
            $mapStructure['long'] = $m_array[$key['Longitude']];
            if (isset($m_array[$key['Picture']]))
                $mapStructure['imageURL'] = $m_array[$key['Picture']];
            if (isset($m_array[$key['Street']]))
                $mapStructure['address'] = $m_array[$key['Street']];
            if (isset($m_array[$key['Descr']]))
                $mapStructure['description'] = filter_var(stripslashes($m_array[$key['Descr']]), FILTER_UNSAFE_RAW,FILTER_FLAG_STRIP_HIGH);

// This line translates the array into an SQL insert format, and enters it in the MobilEdu
            // database
            $sql->insertArray("MPBuildings", $mapStructure, false);
        }
    }
    $sql->byPassTransactionSafeQueryCheck = false;
}
```

FIG. 3B

| | | id | name | lat | long | imageURL | school_id | school_building_id | handicap | address |
|---|---|---|---|---|---|---|---|---|---|---|
| ☐ | ✏ ✕ | 11096 | Center for Academic Services (Sadler Hall) | 32.709058 | -97.361478 | Need picture of Sadler Hall | 7 | ACA | | 2900 South University Drive |
| ☐ | ✏ ✕ | 11097 | Freshman, Transfer and International Admission (Sa... | 32.708658 | -97.361462 | Need picture of Sadler Hall | 7 | ADMI | | 2900 South University Drive |
| ☐ | ✏ ✕ | 11098 | Amon G. Carter Hall | 32.709945 | -97.362672 | http://maps.tcu.edu/bldg/imgs/Resources/carterhall... | 7 | AGC | | 3102 Main Drive |
| ☐ | ✏ ✕ | 11099 | Kelly Center Visitor Parking | 32.709944 | -97.365782 | | 7 | ALUP | | 2820 Stadium Drive |
| ☐ | ✏ ✕ | 11100 | ARMY ROTC/Military Science | 32.708299 | -97.359957 | Need picture of ARMY ROTC_end of building | 7 | ARR | | 2955 South University Drive |
| ☐ | ✏ ✕ | 11101 | Air Force ROTC/Aerospace Studies | 32.709785 | -97.356966 | http://maps.tcu.edu/bldg/imgs/Resources/afrotc4.jp... | 7 | AS | | 2800 West Lowden Street |
| ☐ | ✏ ✕ | 11102 | Ballet and Modern Dance Building | 32.707598 | -97.361393 | http://maps.tcu.edu/bldg/imgs/Resources/ballet.jpe... | 7 | BAL | | 3000 South University Drive |
| ☐ | ✏ ✕ | 11103 | Annie Richardson Bass Building | 32.708055 | -97.357148 | http://maps.tcu.edu/bldg/imgs/Resources/bass.jpeg | 7 | BAS | | 2800 West Bowie Street |
| ☐ | ✏ ✕ | 11104 | Lupton Stadium (Baseball) | 32.702632 | -97.372101 | Need picture | 7 | BASE | | 3700 West Berry Street |

```
<rss version="2.0">
<channel>
<title>Alumni Updates</title>
<link>http://www.schoolalumni.org/xml/homepage.xml</link>
<description>Alumni RSS/Atom Feed</description>
<item>
<title>University Biologist Wins Cosmos Prize</title>
<category>News</category>
<link>http://news.school.edu/news/2009/july27/cosmos_award.html</link>
<img>http://www.schoolalumni.org/images/homepage/features/Daily2.jpg</img>
<description>JULY 29: University alumni John Smith '90 won the Cosmos award for groundbreaking biology work </description>
</item>
<item>...</item>
</channel>
</rss>
```

Sports — 5:33 PM

- Fencing
- Field Hockey
- Football
- Golf
- Gymnastics
- Lacrosse

News — 5:10 PM

Tom Keiser Named to CollegeFootballNews.com All-Freshman Team
Defensive end Tom Keiser, who finished among the Pac-10 Conference leaders in sacks & forced tumbles, was named to...

Ben Muth Named to First Team All-Pac-10 Squad
Gerhart, Fletcure and Ossisai Land Spots on Second Team; Six Stanford Players Earn Honorable Mention Honors Toby Gerhart Named Team MVP at Annual Football Awards Banquet
Running back Toby Gerhart, who broke Stanford's single-season rushing record this season, was presented with living S...

Stanford Well-Represented on Pac-10's All-Academic Team
A total of 12 Stanford football players Schedule: 17 | Score: 24-23

Scores — 5:33 PM

- Stanford at California — Saturday, November 22 — 16 / 37 — LOSS
- USC at Stanford — Saturday, November 15 — 45 / 23 — LOSS
- Stanford at Oregon — Saturday, November 08 — 28 / 35 — LOSS
- Washington State at Stanford — Saturday, November 01 — 0 / 58 — WIN
- Stanford at UCLA — 20 / 23

Schedule: 17 | Score: 24-23

◀ All | Detail

Merrill Lynch Information Session time Tuesday, January 13th 5 PM to 6:15 PM — 632 description Recruiting information session for Merrill Lynch — 634 location Bryan Center Von Canon Room C — 636 contact Brion Nicolette — 638 phone 1 (919) 660-1060 — 640

Add To Favorites

◀ Events | All | Today

▲ January 2009

| Sun | Mon | Tue | Wed | Thr | Fri | Sat |
|---|---|---|---|---|---|---|
| 28 | 29 | 30 | 31 | 1 | 2 | 3 |
| 4 | 5 | 6 | 7 | 8 | 9 | 10 |
| 11 | 12 | 13 | 14 | 15 | 16 | 17 |
| 18 | 19 | 20 | 21 | 22 | 23 | 24 |
| 25 | 26 | 27 | 28 | 29 | 30 | 31 | all-day "How full of life those days…. Perkings Library

8 AM Thursday Catholic Mass

▼ | List | Day | Month | ▲

FIG. 6D

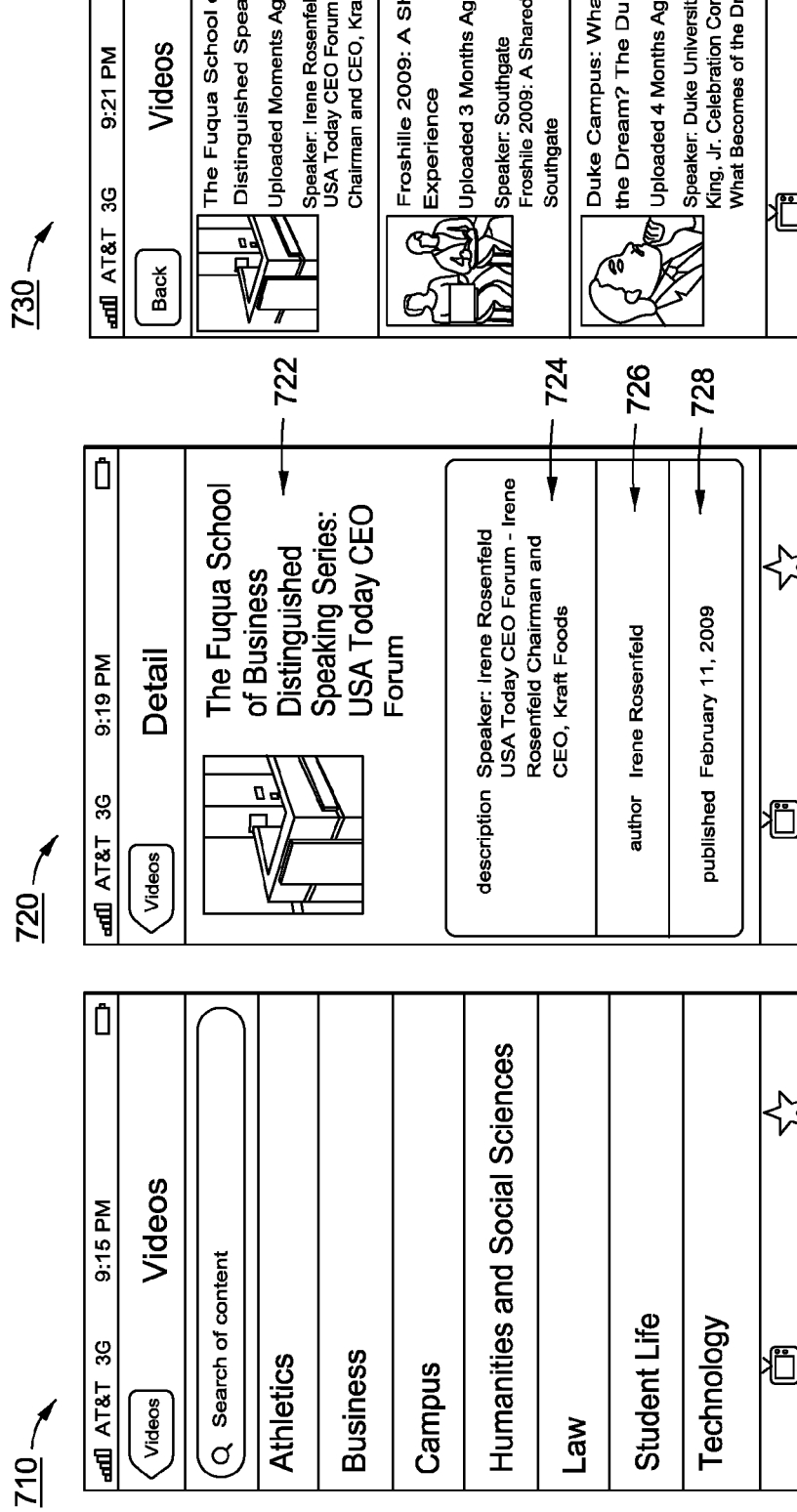

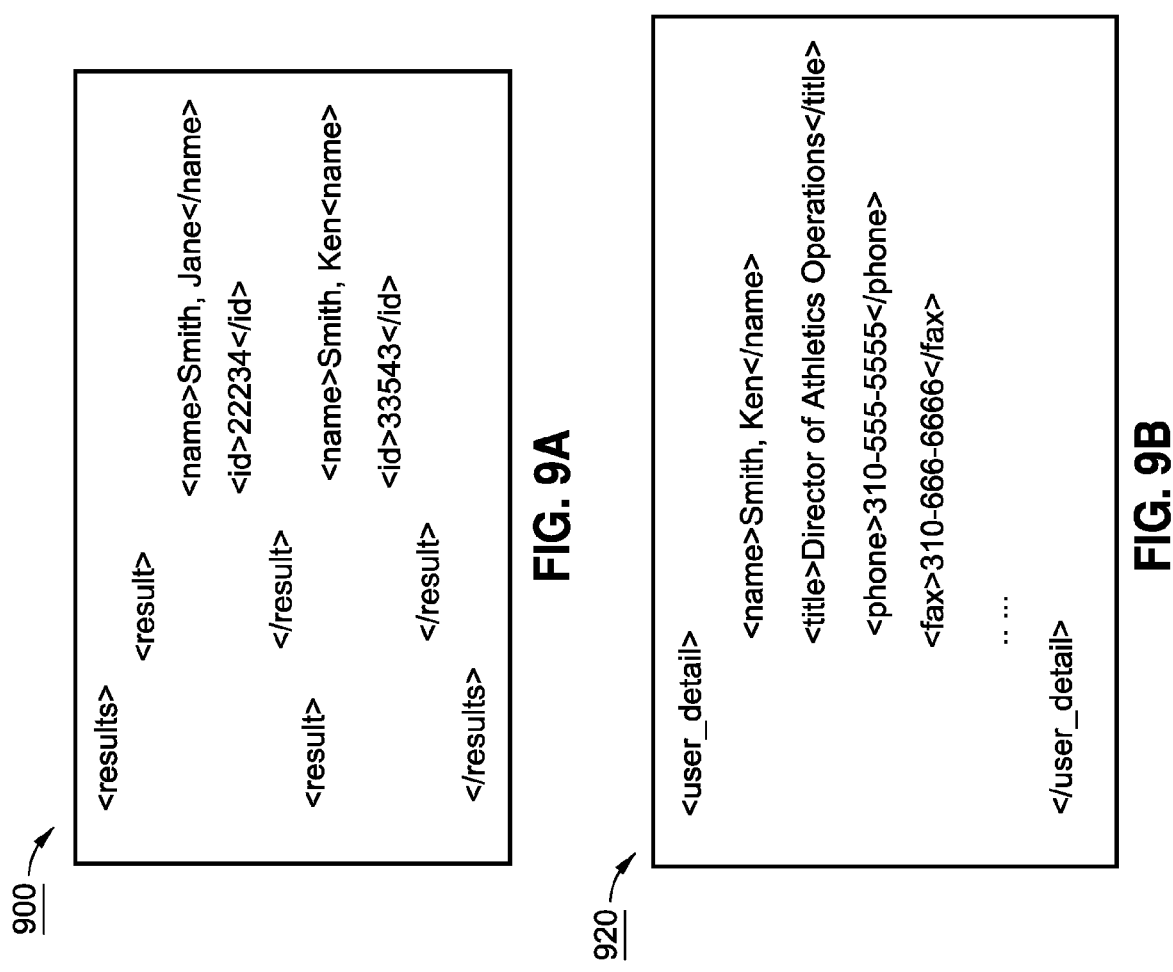

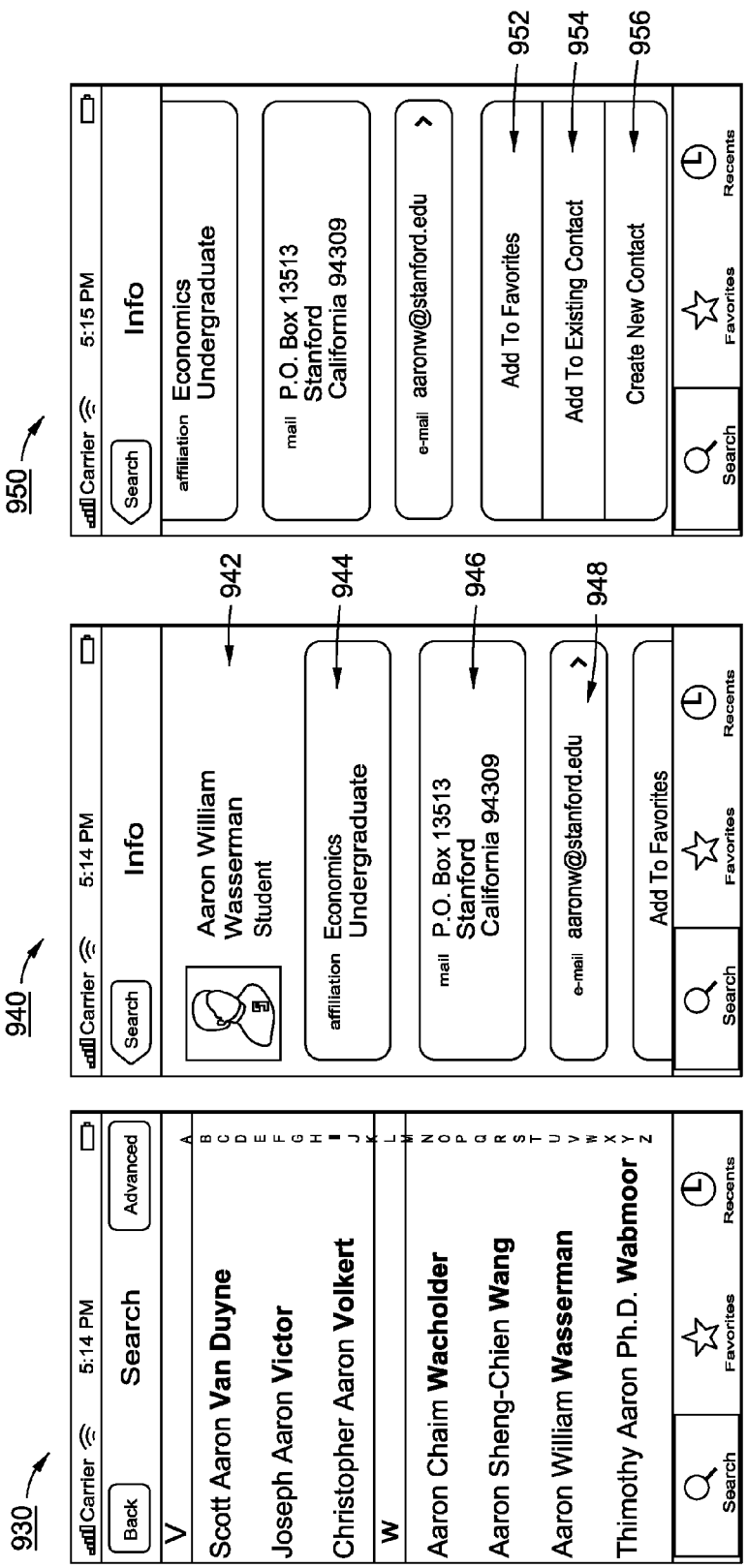

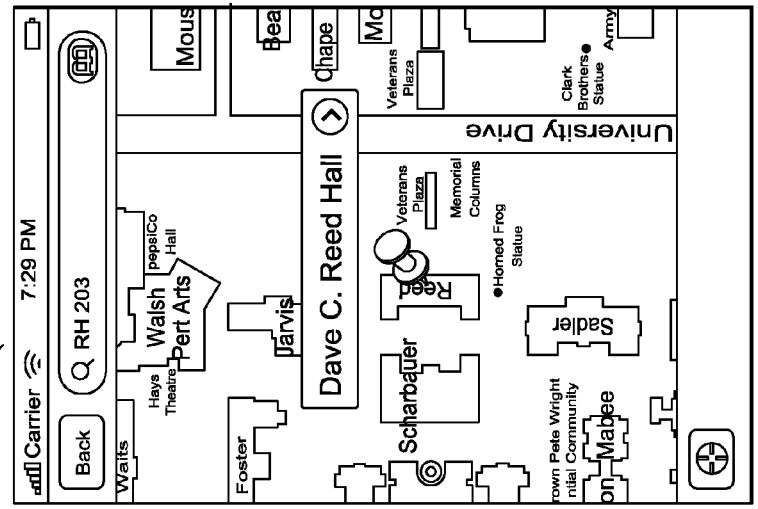
```
[(TCUIApplicationDelegate *)[UIApplication sharedApplication].delegate
performSelector:@selector(searchFor:)
onApplication:@"maps"
withObject: VALUE(indexPath.section, @"rows", IndexPath.row, @"value")];
```
FIG. 12A
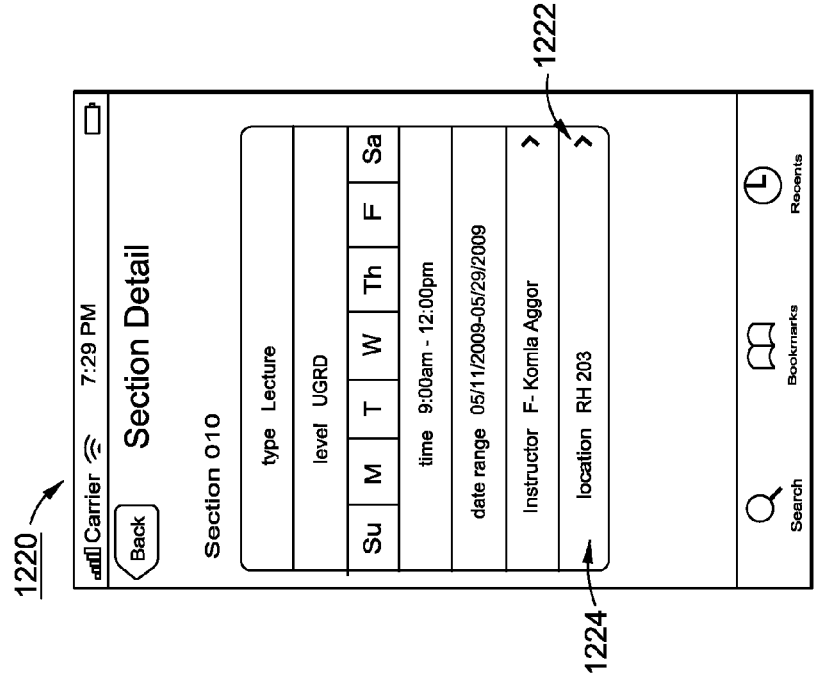
FIG. 12B
FIG. 12C

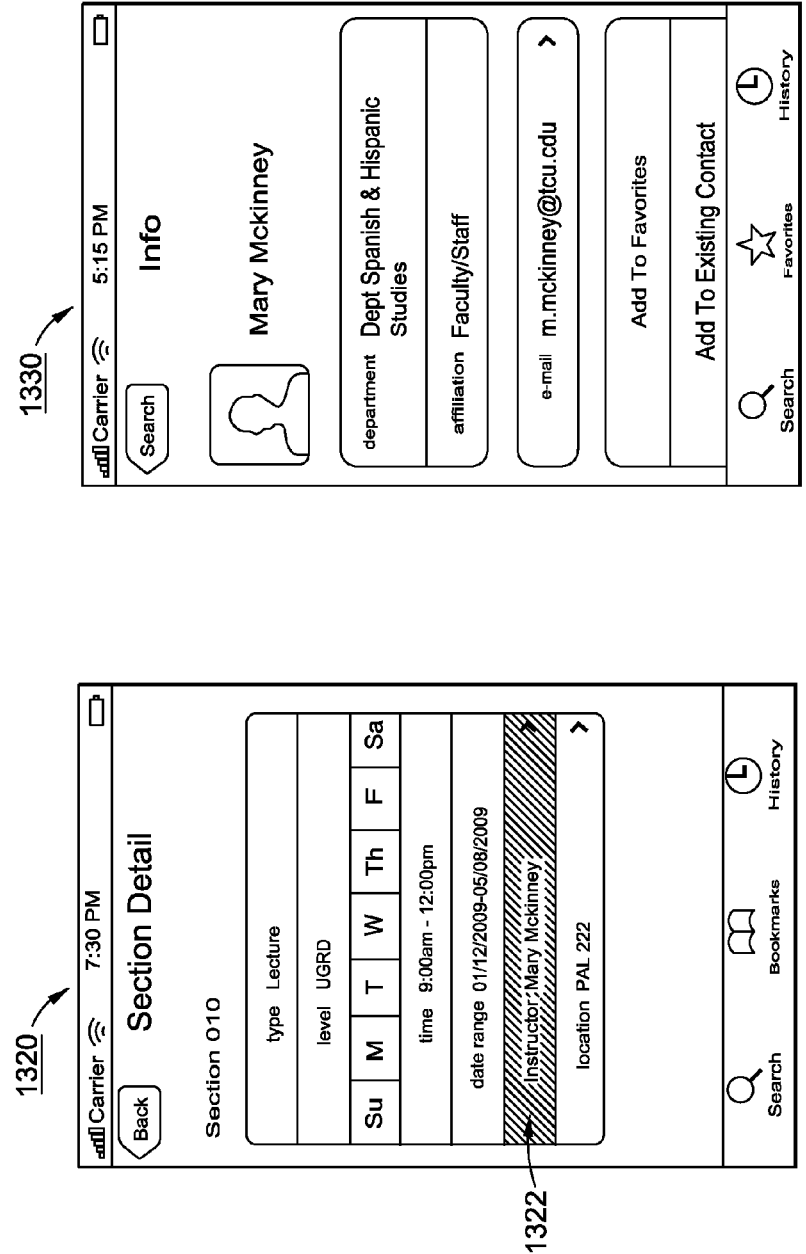

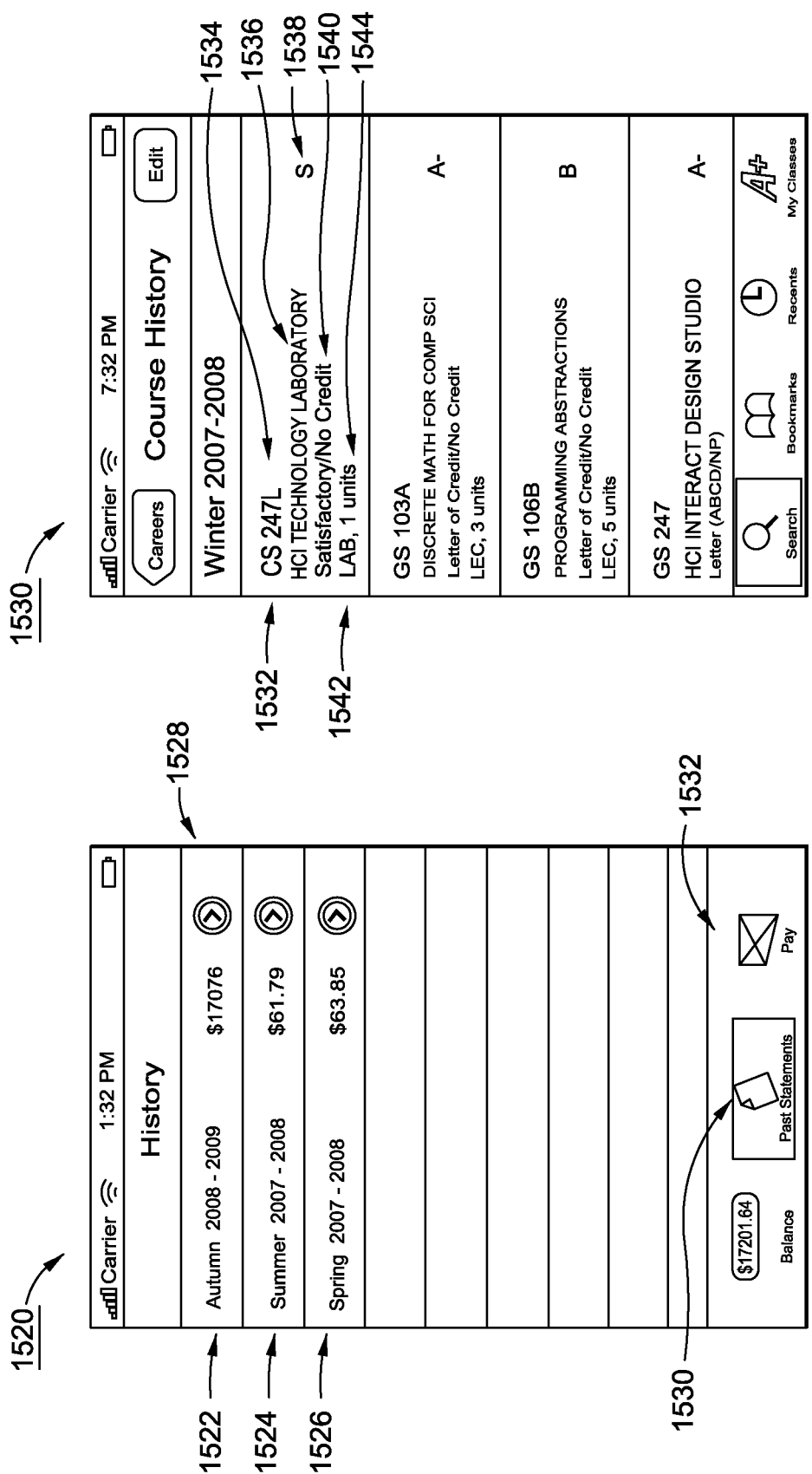

FORMAT GENERALIZATION OF INSTITUTIONAL CONTENT FOR MOBILE DELIVERY

BACKGROUND

1. Field

The present disclosure generally relates to computer software and hardware systems, and more particularly, to content delivery to mobile devices.

2. Description of the Related Art

The ability of educators, including educational institutions, private corporations, and institutions of higher learning, to reach potential students has generally been limited by geography. The advent of networked computers and communications has afforded a partial solution to these limitations. In particular, the widespread use and availability of electronic networks such as the Internet and the World Wide Web have made it possible for educational institutions to overcome geographic dispersion and physical location as a barrier to education by providing institutions with the ability to provide institutional (e.g., instructional) content over the network.

In many instances, mobile devices (e.g., personal digital assistants and cellular telephones) with network connections are capable of accessing the instructional content using built-in network software, such as a mobile web browser. The information these mobile devices access are located on existing or legacy network-based systems that are typically not configured for providing content for mobile viewing. The addition of yet another network-based system that is configured to provide information configured for mobile viewing requires the host or sponsoring institution to incur implementation and maintenance costs associated with the installation, integration, administration, and maintenance of a new network-based system hosting otherwise duplicative information. These costs hinder the widespread use of the mobile medium for educational purposes.

To the extent that institutions do provide instructional content configured for viewing on mobile devices, they have relatively complicated and confusing user interfaces. Users of these mobile devices who require different types of information related to their institution, or require information to supplement a web page they are viewing, are typically required to manually locate a subsequent web page or function from among a large array of potential institutional pages to obtain the information they seek, thereby complicating the user's task of interacting with the system. For example, a student using a mobile device to view information on a class from a class directory on a mobile web page for a university will often be required to manually seek out a separate web page for a campus map, and thereafter manually locate the class on the campus map web page. These complications further hinder the widespread use of the mobile medium for institutional purposes.

SUMMARY

The present disclosure overcomes the problems of conventional systems by disclosing a system that provides integrated, user-aware institutional content configured for mobile viewing. Using a single, mobile user interface, a user of the system has access to various types of information provided by an institution. The mobile user interface is accessible by various client devices. The system accesses existing network-based systems of one or many institutions, thereby removing the need for those institutions to provide separate, independent sources of mobile content.

In certain embodiments of the disclosure, a system for generalizing the format of instructional content for mobile delivery is disclosed. The system includes a processor configured to identify institutional content in a client-specific data file, and further configured to store, in a memory, the identified institutional content as generalized institutional content. The system also includes a communications module configured to receive, from a mobile device, a request for the generalized institutional content. The processor is configured to provide, to the mobile device in response to the request, the generalized institutional content in a format configured for display on the mobile device.

In certain embodiments of the disclosure, a method for generalizing the format of instructional content for mobile delivery is disclosed. The method includes identifying institutional content in a client-specific data file, and storing, in a memory, the identified institutional content as generalized institutional content. The method also includes receiving, from a mobile device, a request for the generalized institutional content, and providing, to the mobile device in response to the request, the generalized institutional content in a format configured for display on the mobile device.

In certain embodiments of the disclosure, a computer-readable medium having computer-executable instructions for causing a processor to execute instructions to generalize the format of instructional content for mobile delivery by performing certain steps is disclosed. The steps include identifying institutional content in a client-specific data file, and storing, in a memory, the identified institutional content as generalized institutional content. The steps also include receiving, from a mobile device, a request for the generalized institutional content, and providing, to the mobile device in response to the request, the generalized institutional content in a format configured for display on the mobile device.

In certain embodiments of the disclosure, a system for integrating user-specific institutional content for mobile delivery is disclosed. The system includes a communications module configured to receive, from a mobile device, a request for target institutional content based on source institutional content and an identification of a user. The system also includes a processor configured to obtain, from a memory, the target institutional content based on the source institutional content and the identification of the user, and further configured to provide, to the mobile device in response to the request, the generalized institutional content in a format configured for display on the mobile device.

In certain embodiments of the disclosure, a method for integrating user-specific institutional content for mobile delivery is disclosed. The method includes receiving, from a mobile device, a request for target institutional content based on source institutional content and an identification of a user, and obtaining, from a memory, the target institutional content based on the source institutional content and the identification of the user. The method also includes providing, to the mobile device in response to the request, the generalized institutional content in a format configured for display on the mobile device.

In certain embodiments of the disclosure, a computer-readable medium having computer-executable instructions for causing a processor to execute instructions to integrate user-specific institutional content for mobile delivery by performing certain steps is disclosed. The steps include receiving, from a mobile device, a request for target institutional content based on source institutional content and an identification of a user, and obtaining, from a memory, the target institutional content based on the source institutional content and the identification of the user. The steps also include providing, to the mobile device in response to the request, the generalized institutional content in a format configured for display on the mobile device.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIG. 3B is exemplary source code for extracting the client-specific map data of FIG. 3A according to the process of FIG. 2.

FIG. 3C illustrates the extracted client-specific map data of FIGS. 3A-3B stored in a generalized format according to the process of FIG. 2.

FIG. 4A shows exemplary client-specific news data stored in a client-specific data file at an institutional client.

FIGS. 5A-5C are exemplary screenshots illustrating, in a mobile format, portions of extracted client-specific athletics data.

FIGS. 6A-6D are exemplary screenshots illustrating, in a mobile format, portions of extracted client-specific events data.

FIGS. 7A-7C are exemplary screenshots illustrating, in a mobile format, portions of extracted client-specific videos data.

FIGS. 9A-9B are each exemplary client-specific directory data stored in a client-specific data file in the client-specific data store at the institutional client.

FIGS. 9C-9E are exemplary screenshots illustrating, in a mobile format, portions of extracted client-specific directory data.

FIG. 12A is exemplary source code for processing an integrated information request for map data from course data according to the process of FIG. 11.

FIG. 12B is an exemplary screenshot illustrating, in a mobile format, the source course web page from which the integrated information request for map data processed in FIG. 12A was requested.

FIG. 12C is an exemplary screenshot illustrating, in a mobile format, the target map web page resulting from the integrated information request for map data processed in FIG. 12A.

FIG. 13A is exemplary source code for processing an integrated information request for directory data from course data according to the process of FIG. 11.

FIG. 13B is an exemplary screenshot illustrating, in a mobile format, the source course web page from which the integrated information request for directory data processed in FIG. 13A was requested.

FIG. 13C is an exemplary screenshot illustrating, in a mobile format, the target directory web page resulting from the integrated information request for directory data processed in FIG. 13A.

FIGS. 15B-15C are exemplary screenshots illustrating, in a mobile format, the user-specific accounting option.

FIG. 15D is an exemplary screenshot illustrating, in a mobile format, a user-specific profile option.

DETAILED DESCRIPTION

There is a problem, in mobile institutional content delivery, of various types of institutional content being too difficult to access, incorrectly formatted for mobile devices, and not targeted to a user. This and other problems are addressed and solved, at least in part, by embodiments of the present disclosure, which include a mobile delivery system for institutional content. In certain embodiments, the system includes a processor configured to identify institutional content in a client-specific data file, and further configured to store, in a memory, the identified institutional content as generalized institutional content. The system also includes a communications module configured to receive, from a mobile device, a request for the generalized institutional content. The processor is configured to provide, to the mobile device in response to the request, the generalized institutional content in a format configured for display on the mobile device. In certain embodiments, the system includes a communications module configured to receive, from a mobile device, a request for target institutional content of a second data type based on source institutional content of a first data type. The system also includes a processor configured to obtain, from a memory, the target institutional content based on the source institutional content, and further configured to provide, to the mobile device in response to the request, the generalized institutional content in a format configured for display on the mobile device.

In the following detailed description, numerous specific details are set forth to provide a full understanding of the present disclosure. It will be obvious, however, to one ordinarily skilled in the art that the embodiments of the present disclosure may be practiced without some of these specific details. In other instances, well-known structures and techniques have not been shown in detail so as not to obscure the disclosure.

While many examples are provided herein in the context of an educational institution, the principles of the present disclosure contemplate other types of organizations as well. For example, corporations and governmental entities (e.g., administrative or military) are all considered within the scope of the present disclosure. An institution may also be a consortium of schools and/or campuses. In general terms, an institution is an operating unit and is, itself, made up of different operating units that may correspond to campuses, colleges, departments, sub-departments, etc. The systems and methods described herein do not require any particular arrangement of operating units but, instead, allow the institution to model its organization into a hierarchy of operating units for purposes of management, planning, and reporting.

Figure 1:
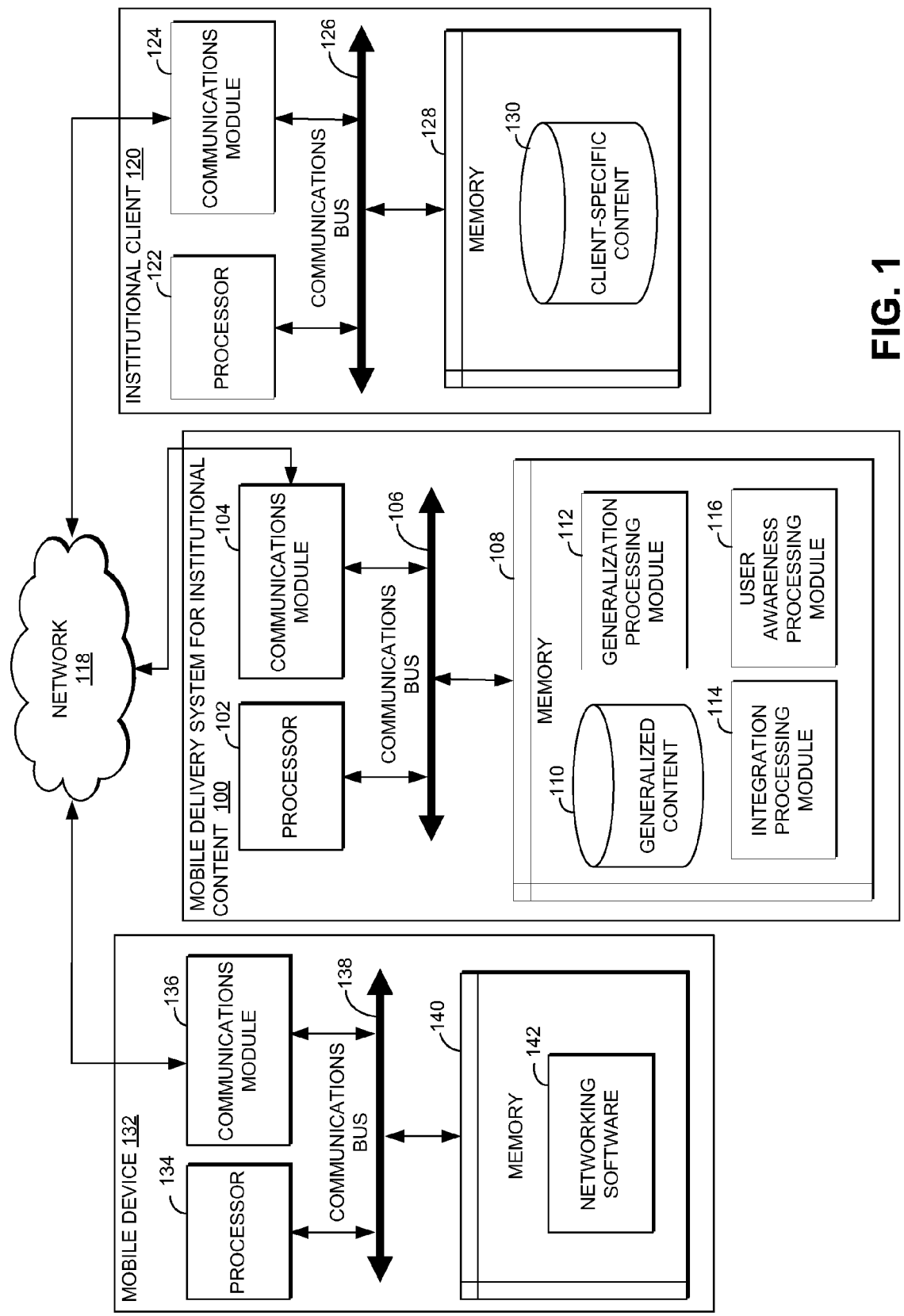
FIG. 1 is a diagram illustrating a mobile delivery system for institutional content according to certain embodiments.

FIG. 1 is a diagram illustrating a mobile delivery system for institutional content 100 (hereinafter "system 100") according to certain embodiments. The system 100 includes a processor 102, communications module 104, and memory 108, each connected by a communications bus 106. The system 100 is configured to be connected to one or many institutional clients 120 and one or many mobile devices 132 over a network 118.

The system 100 can represent a computer or a laptop computer. In certain embodiments, with appropriate processing power, the system 100 can represent a server, a thin client, a personal digital assistant (PDA), a portable computing device, a mobile intelligent device (MID) (e.g., a smartphone), a software as a service (SAAS), or a suitable device with a processor 102 and memory 108. The system 100 can be stationary or mobile. The system 100 may also be managed by a host, such as over a network 118. The system 100 is wired or wirelessly connected to the network 118 via a communications module 106. The communications module 106 is connected to the network 118, for example, via a modem connection, a local-area network (LAN) connection including the Ethernet, or a broadband wide-area network (WAN) connection, such as a digital subscriber line (DSL), cable, T1, T3, fiber optic, or satellite connection. In the illustrated embodiment, the network 118 is the Internet, although in certain embodiments, the network 118 can be a LAN network or a corporate WAN network. The network 118 may include features such as a firewall.

The computer-readable memory 108 of the system 100 includes a generalization processing module 112, integration processing module 114, a user awareness processing module 116, and a generalized content data store 110. The generalization processing module 112, integration processing module 114, and a user awareness processing module 116 may be a single software application, individual software applications, or may each comprise multiple software applications. The generalization processing module 112 stores computer-readable instructions executable by the processor 102 to receive client-specific data in one or many client-specific data files from the client-specific content data store 130. Client-specific data includes, for example, data that is stored in a format specific to the client (e.g., institutional client 120), such as a file format (e.g., PDF, TXT, and XML files) or format within the file (e.g., a specific tag identifying a student may be given different names at different institutions). The generalization processing module 112 stores computer-readable instructions executable by the processor 102 to extract instances of client-specific data from the client-specific content data file that match a target type. For example, the generalization processing module 112 is configured to parse through the client-specific content data files of the client-specific data store 130 and extract client-specific data matching various data types, including, but not limited to, map data, news data, athletics data, events data, videos data, images data, directory data, and courses data, as discussed with reference to FIGS. 2-10C below. In certain embodiments, the data types are identified based on identifiers associated with the client-specific data. For example, the identifier can be a metatag, such as the metatag "name" for a student name. As another example, the identifier can be a comma and/or line format, such as where certain types of data separated by commas appear in a certain order. Additional details regarding identifying the data types to extract are discussed below, again with reference to FIGS. 2-10C.

Information from the client-specific content data store 130 is received, for example, from an institutional client 120 via its communications module 124 and the system's communications module 104 over the network 118. The client-specific content data store 130 may store data in various formats, including, but not limited to: a database, a SQL-extract, text file, web feed format such as an XML feed or Really Simple Syndication (RSS) feed, Microsoft Excel® file, or Microsoft Word® file. In certain embodiments, the client-specific content data store 130 is stored in memory 128 at the institutional client 120, such as in a comma separated file format, while in certain embodiments, the client-specific content data store 130 is stored in memory 128 on a third-party server accessible by the system 100, such as in a web feed format.

The generalization processing module 112 also stores computer-readable instructions executable by the processor 102 to store the extracted data in the generalized content data store 110. For example, the extracted data may be temporarily stored in volatile memory (e.g., RAM), or stored for later use in non-volatile memory (e.g., a hard disk drive). In certain embodiments, the extracted data that is stored as generalized data is platform-independent, e.g., it is not specific to any platform, model, or device type. In certain embodiments, the client-specific data can be extracted directly from the client-specific content data store 130 of the institutional client 120 upon request from a mobile device ("real-time"), where it may or may not be stored in the generalized content data store 110. For example, if the client-specific content data store 130 is dynamically or frequently updated, it may be beneficial to extract client-specific data from the client-specific content data store 130 at the institutional client 120 in real-time, such that the extracted client-specific data is up-to-date. In certain embodiments, the client-specific data can be extracted on a predetermined schedule, whereupon it is stored in the generalized content data store 110. For example, if the client-specific content data store 130 is infrequently updated or updated on a fixed schedule, it may be beneficial to extract client-specific data from the client-specific content data store 130 at the institutional client 120 on a predetermined schedule and store the extracted data in the memory of the system 100 (e.g., in the generalized content data store 110) in order to reduce the processing burden of the system 100 in response to multiple requests, and to reduce the burden on the network connection 118 between the system 100 and the institutional client 120. In certain embodiments, the generalized content data store 110 is a database, such as a SQL database. Although in the illustrated embodiment the generalized content data store 110 is stored in the memory 108 of the system 100, in certain embodiments, the generalized content data store 110 is stored in memory 128 at the institutional client 120.

The integration processing module 114 stores computer-readable instructions executable by the processor 102 to receive an integrated information request for base-to-target data, obtain the target data based on the base information provided in the request, and then return the target data. For example, in response to an integrated information request targeting a location of a building on a map requested over the network 118 from a base web page of a mobile device 132 listing information on the building, the system 100 would obtain the location of the building on a map formatted for mobile viewing, and return the map highlighting the location of the building to the mobile device 132. The system 100 is configured to process various types of integrated information requests, including, but not limited to, a request for target maps data from a base course web page, a request for target directory data from a base course web page, a request for target directory data from a base events web page, a request for target maps data from a base events web page, a request for target maps data from a base directory web page, a request for target maps data from a base dining places web page, and a request for target maps data from a base library web page. The target data can be obtained either in real-time directly from the institutional client 120, or from the generalized content data store 110 of the system 100.

The user awareness processing module 116 stores computer-readable instructions executable by the processor 102 to provide a user with options to access mobile institutional content that is specific to (or "aware of") the user. For example, the mobile content can be specific to the user's geographic location, account, social network, profile, and other information. The user may be identified by an authentication system provided by the user awareness processing module 116, such as by, without limitation, a username, password, and/or other credentials for the purposes of accounting, security, logging, and resource management.

The institutional client 120 can represent a computer or a laptop computer. In certain embodiments, with appropriate processing power, the institutional client 120 can represent a server, a thin client, a personal digital assistant (PDA), a portable computing device, a mobile intelligent device (MID), a system as a service (SAAS), or a suitable device with a processor 122 and memory 128. The institutional client 120 can be stationary or mobile. The institutional client 120 may also be managed by a host, such as over network 118. The institutional client 120 may be physically located at the institution, such as at a university campus, or remotely located away from the actual campus.

The mobile device 132 can be a device configured for mobile use that includes a memory 140, processor 134, and communications module 136 that communicate over a communications bus 138. Exemplary mobile devices 132 include, but are not limited to, cellular telephones, MIDs, and PDAs. Well known mobile devices 132 that are configurable for use with the disclosed system 100 include the Apple iPhone® and the Blackberry Storm®. Other mobile devices 132 from these and other manufacturers can also be used. The mobile device 132 is configured to view the generalized content 110 of the system 100 using networking software 142, such as a web browser, that retrieves the generalized content 110 over the network 118 using the mobile device's communications module 136.

Figure 2:
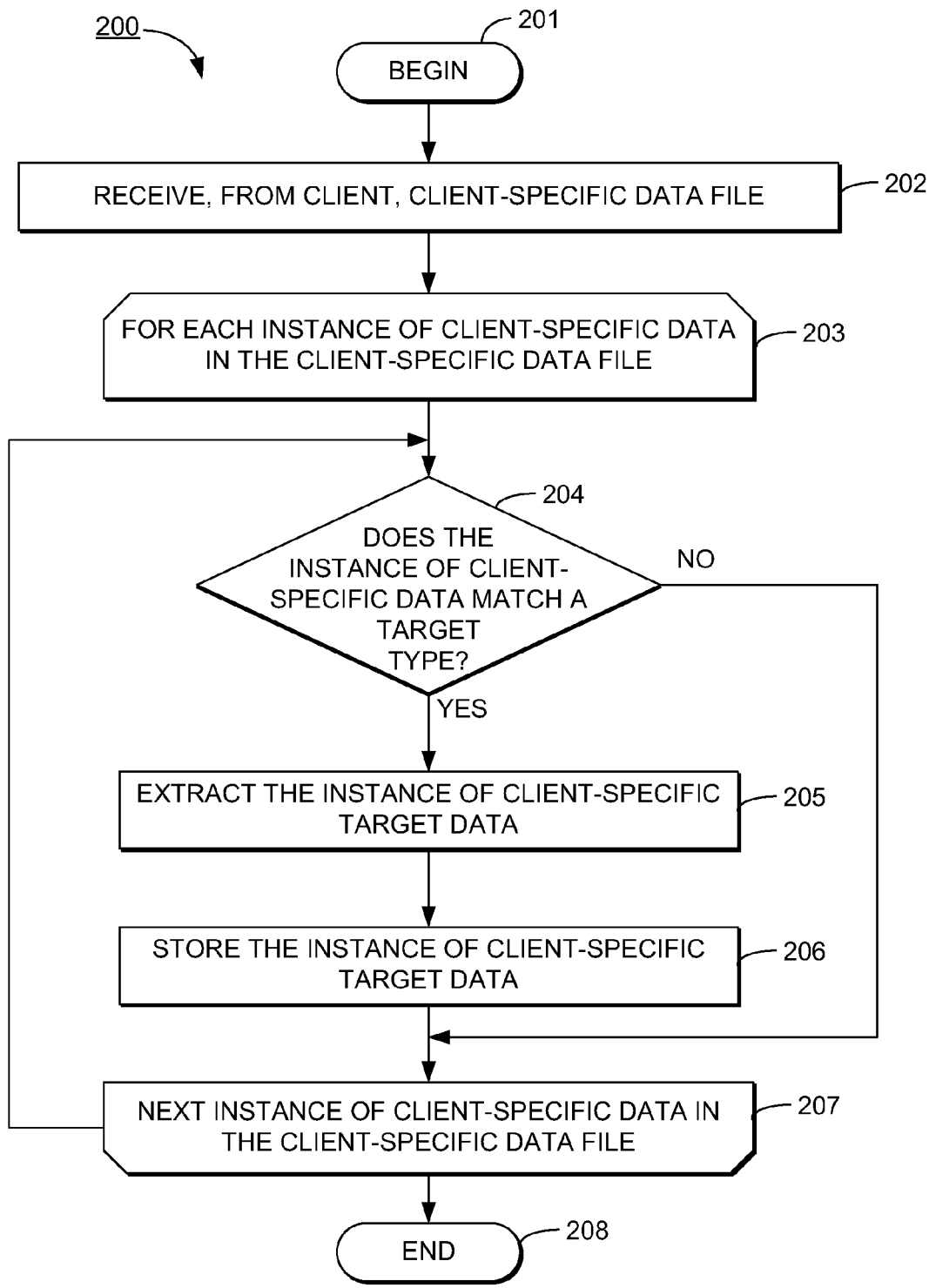
FIG. 2 is a flow chart illustrating an exemplary process for generalizing client-specific data.

FIG. 2 is a flow chart illustrating an exemplary process 200 for generalizing client-specific data. The process 200 proceeds from beginning step 201 to step 202, in which a client-specific data file (e.g., from client specific content data store 130) is received from a client (e.g., institutional client 120). A loop represented by steps 203 to 207 is then repeated for each instance of client-specific data in the client-specific data file. In decision step 204, if the instance of client-specific data matches a target type, then that instance is extracted in step 205 and optionally stored (e.g., in generalized content data store 110) in step 206, and the process 200 proceeds to end loop step 207. In decision step 204, if the instance of client-specific data does not match a target type, then the process 200 proceeds directly to end loop step 207. If in end loop step 207 any instances of client-specific data remain in the client-specific data file, the process 200 returns to decision step 204, otherwise the process 200 ends in end step 208.

Figure 3A:
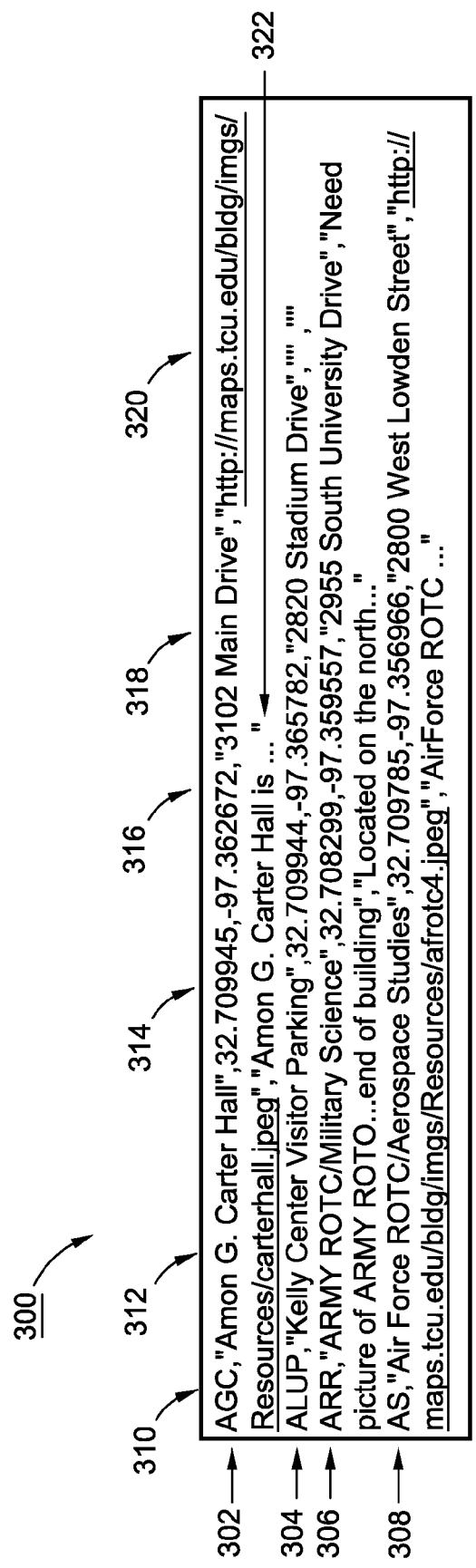
FIG. 3A shows exemplary client-specific map data stored in a client-specific data file at an institutional client.
Figure 3E:
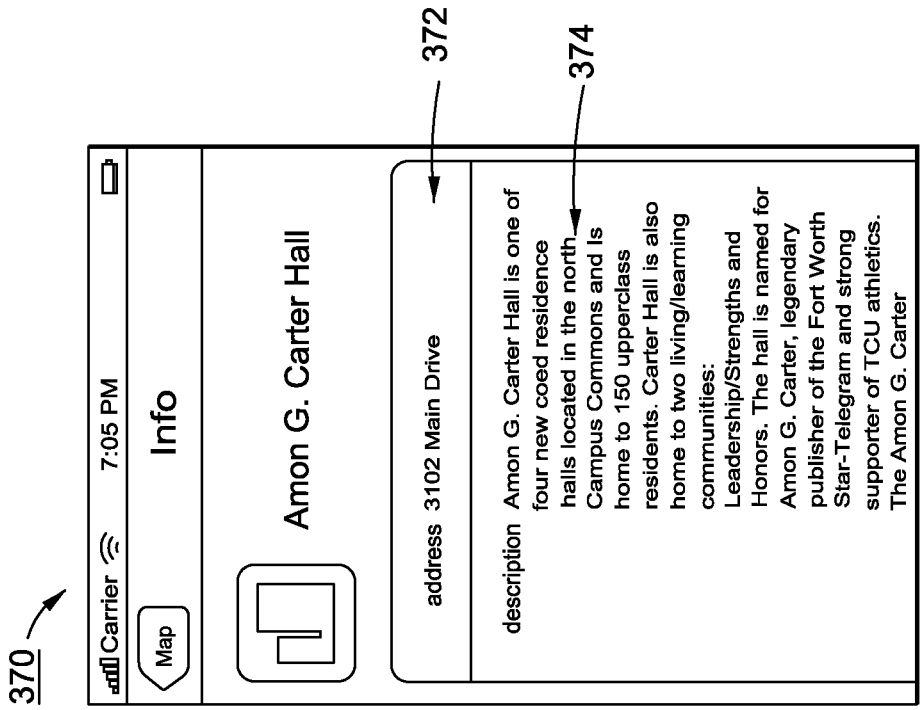
FIGS. 3D-3E are exemplary screenshots illustrating, in a mobile format, portions of the extracted client-specific map data of FIG. 3C.

Having set forth in FIG. 2 a process 200 for generalizing client-specific data using the mobile delivery system for institutional content 100 of FIG. 1, an example will now be presented using the process 200 of FIG. 2 and client-specific map data. The process 200 proceeds from beginning step 201 to step 202, in which a client-specific map data file is received by the system 100 from the client-specific content data store 130 of the institutional client 120. FIG. 3A shows exemplary client-specific map data 300 stored in a client-specific data file at the institutional client 120. The client-specific map data 300 is in a comma separated format, wherein each line-separated entry 302-308 represents a building and includes a code 310, map name 312, latitude 314, longitude 316, street address 318, picture location 320, and description 322. In certain embodiments, the client-specific map data 300 is in the form of a SQL-extract, text file, XML feed, RSS feed, Microsoft Excel® file, or Microsoft Word® file.

Returning to the process 200, a loop represented by steps 203 to 207 is repeated for each entry 302-308 of client-specific map data. FIG. 3B is exemplary source code 330 for steps 203 to 207 of the process 200 of FIG. 2. For the first entry 302, it is determined in decision step 204 that the instance of client-specific data, "AGC," matches the target data type of code 310, indicating a unique location code attribute for the building. Other target data types are analyzed including, but not limited to, map name 312, latitude 314, longitude 316, street address 318, picture location 320, and description 322, and handicap accessibility.

The client-specific map data instance is extracted in step 205 and stored in the generalized content data store 110 in step 206. The process 200 proceeds to end loop step 207, and repeats for the remaining instances of client-specific map data for the first entry 302, and for the remaining entries 304-308, thereby extracting, from the client-specific map data file, all instances of client-specific map data that match a target type. FIG. 3C illustrates a portion 340 of the generalized content data store 110 reflecting the extracted client-specific map data of FIG. 3A in generalized format. The first entry 302 of the client-specific map data 300 stored in a client-specific data file is illustrated as a stored, generalized entry 342. With the loop of steps 203-207 completed, the process 200 ends in end step 208.

Figure 3D:
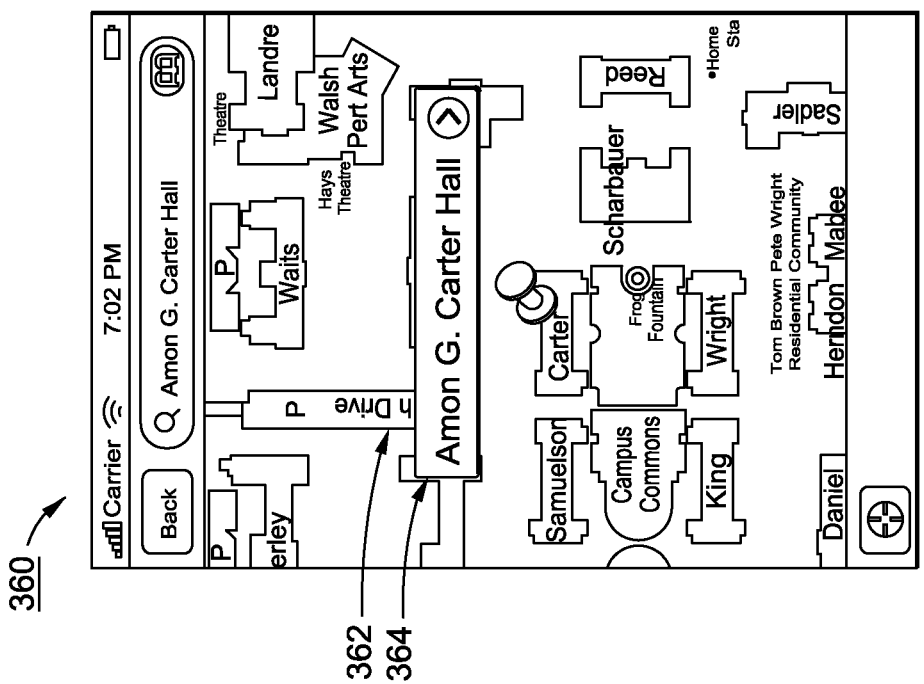

FIG. 3D illustrates, in a mobile format, the first stored, generalized entry 342 as a highlighted location 362 on a map image 360 of the associated institution. The map image 360 may be retrieved using a web-service that returns locations based on a search query. The map image is in a vector format file that is northward facing and to scale, thereby enabling global positioning system (GPS) compatibility and geocode coordinated translations. The highlighted location 362 is determined using the extracted latitude 314 and longitude 316 coordinates stored in the generalized content data store 110. The title 364 of the highlighted location, "Amon G. Carter Hall," is displayed from the extracted map name 312 stored in the generalized content data store 110. The user may select the highlighted location 362 for additional information on the highlighted location 362 (e.g., by double-clicking the location), and the user will be taken to the exemplary screenshot 370 illustrated in FIG. 3E. The screenshot 370 includes additional information such as the street address 372 and description 374 of the highlighted location, respectively retrieved from the extracted street address 318 and description 322 stored in the generalized content data store 110. A picture of the highlighted location, although not illustrated, may also be viewed, retrieved from the extracted picture location 320 stored in the generalized content data store 110.

In addition to the generalized directory content illustrated above with reference to FIGS. 3A-3E, the system 100 is also configured to provide generalized mobile content based on client-specific news and sports data extracted from the client-specific content data store 130 according to the process 200 of FIG. 2.

The system 100 is configured to access client-specific news and sports data based on selected target data types, such as selected target data types from RSS or XML feeds having categories (e.g., top news, around campus, etc.) for selected items. Additional information to facilitate the client-specific data extraction includes structure and hierarchy information about the categories of the RSS feed, as well as links to the individual RSS feeds (e.g., for news stories) which would populate each category.

FIG. 4A shows exemplary client-specific news data 400 stored in a client-specific data file in the client-specific data store 130 at the institutional client 120. In certain embodiments, the client-specific news data 400 is made available by the institutional client 120, but may be located elsewhere, such as on a remote server as a web feed, as illustrated.

Figures 4B, 4C, 4D:
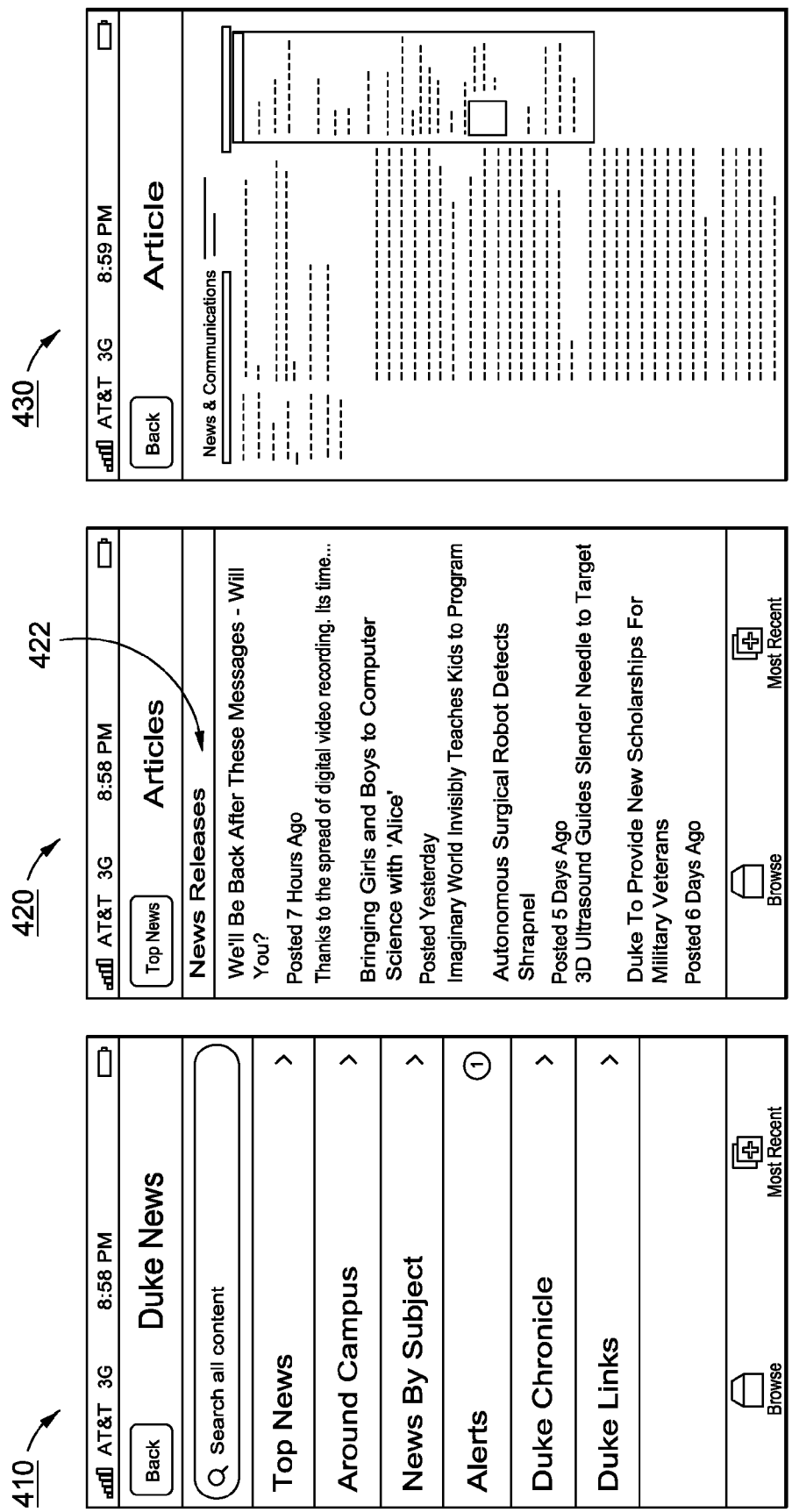
FIGS. 4B-4D are exemplary screenshots illustrating, in a mobile format, portions of extracted client-specific news data.

FIG. 4B is a screenshot 410 from a mobile device illustrating in a mobile format various categories of the news data that were extracted in real-time from the client-specific news data 400 of the client-specific content data store 130. FIG. 4C is a screenshot 420 illustrating in a mobile format various news articles in the "Top News" category 422 provided by the client-specific news data that was extracted in real-time from the client-specific content data store 130. FIG. 4C is a screenshot 430 illustrating in a mobile format a selected news article provided by the client-specific news data that was extracted in real-time from the client-specific content data store 130.

FIG. 5A is a screenshot 510 illustrating in a mobile format various categories of the client-specific sports data that were extracted in real-time from the client-specific content data store 130. FIG. 5B is a screenshot 520 illustrating in a mobile format various sports articles in the "News" category 522 provided by the client-specific sports data that was extracted in real-time from the client-specific content data store 130. FIG. 5C is a screenshot 530 illustrating in a mobile format selected game scores provided by the client-specific sports data that was extracted in real-time from the client-specific content data store 130.

The system 100 is also configured to provide generalized mobile content based on client-specific events data extracted from the client-specific content data store 130 according to the process 200 of FIG. 2. The system 100 is configured to access client-specific events data based on selected target data types, such as selected target data types from RSS or XML feeds having categories (e.g., academic calendar dates, arts, etc.) for selected items. Additional target-type information to facilitate the client-specific data extraction includes, but is not limited to, start dates and times, end dates and times, unique event identifiers, locations, event descriptions, contact information, and costs (if applicable).

Figures 6A, 6B:
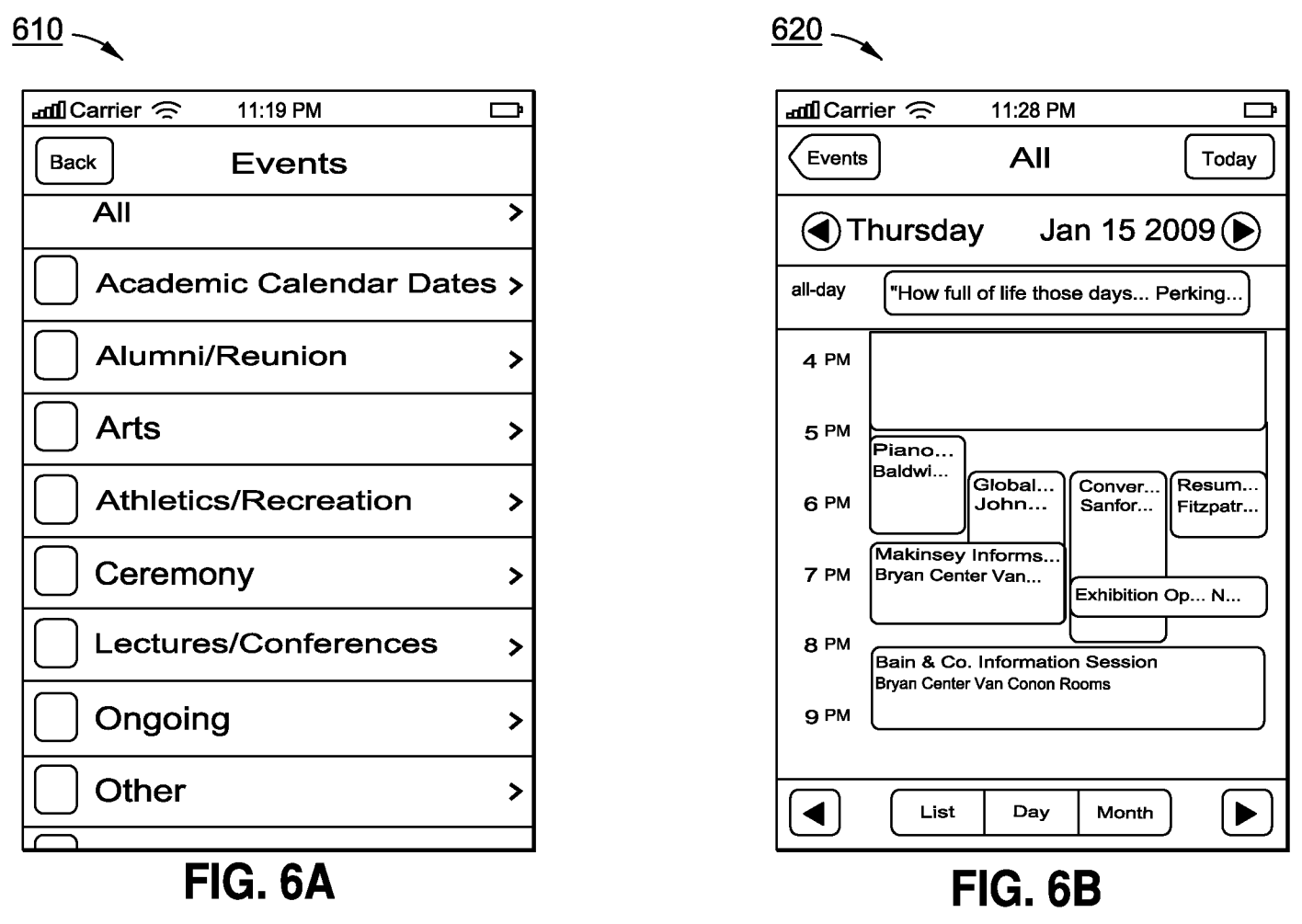

FIG. 6A is a screenshot 610 illustrating in a mobile format various categories of the client-specific events data that were extracted in real-time from the client-specific content data store 130. Each category is associated with a different color. In certain embodiments, other visual or audio indications may be used to indicate categories, such as various shadings or audible alerts. FIG. 6B is a screenshot 620 illustrating, in a mobile, day-view format, various events, color-coded by category, scheduled for Jan. 15, 2009, that were extracted in real-time from the client-specific content data store 130. FIG. 6C is a screenshot 630 illustrating in a mobile format detailed information on a specific event that was extracted in real-time from the client-specific content data store 130. The detailed information includes a time 632 of the event, description 634 of the event, location 636 of the event, contact information 638 for the event, and a telephone number 640 associated with the event. FIG. 6D is a screenshot 650 illustrating, in a mobile, month-view format, various events, color-coded by category, scheduled for Jan. 13, 2009, that were extracted in real-time from the client-specific content data store 130.

The system 100 is further configured to provide generalized mobile content based on client-specific videos data extracted from the client-specific content data store 130 according to the process 200 of FIG. 2. The system 100 is configured to access and provide client-specific videos data based on selected target data types, such as selected target data types from RSS or XML feeds listing videos associated with the institution (e.g., on a school's servers) and information about those videos. The system 100 is also configured to access and provide client-specific videos data made available through publicly accessible websites. For example, the system 100 can access a YouTube® channel using an institution's user name and URL associated with YouTube®. In certain embodiments, the system 100 is configured to provide videos compatible with mobile devices.

FIG. 7A is a screenshot 710 illustrating in a mobile format various categories (e.g., athletics, business) of the client-specific videos data that were extracted in real-time from the client-specific content data store 130. FIG. 7B is a screenshot 720 illustrating, in a mobile format, detailed information on a specific video that was extracted in real-time from the client-specific content data store 130. The detailed information includes, in addition to the title 722 of the video, a description 724 of the video, an author of the video 726, and a publishing date 728 of the video. FIG. 7C is a screenshot 730 illustrating, in a mobile format, a listing of various videos that were extracted in real-time from the client-specific content data store 130. In certain embodiments, the videos data may be provided from another mobile device, such as by a user of the system 100 who captures the video using a video-capture device associated with his mobile device, and uploads the captured video to the system 100, where it is stored in the generalized content data store 110.

The system 100 is further configured to provide generalized mobile content based on client-specific images data extracted from the client-specific content data store 130 according to the process 200 of FIG. 2. The system 100 is configured to access and provide client-specific images data based on selected target data types, such as selected target data types from RSS or XML feeds, or data files stored in the client-specific content 130 of the institutional client 120. Additional target-type information to facilitate the client-specific data extraction includes, but is not limited to, category names, category descriptions, category hierarchies, thumbnail URLs (e.g., with a size of 100 by 100 pixels), image titles, image content, image copyrights, and image detail URLs.

Figure 8A:
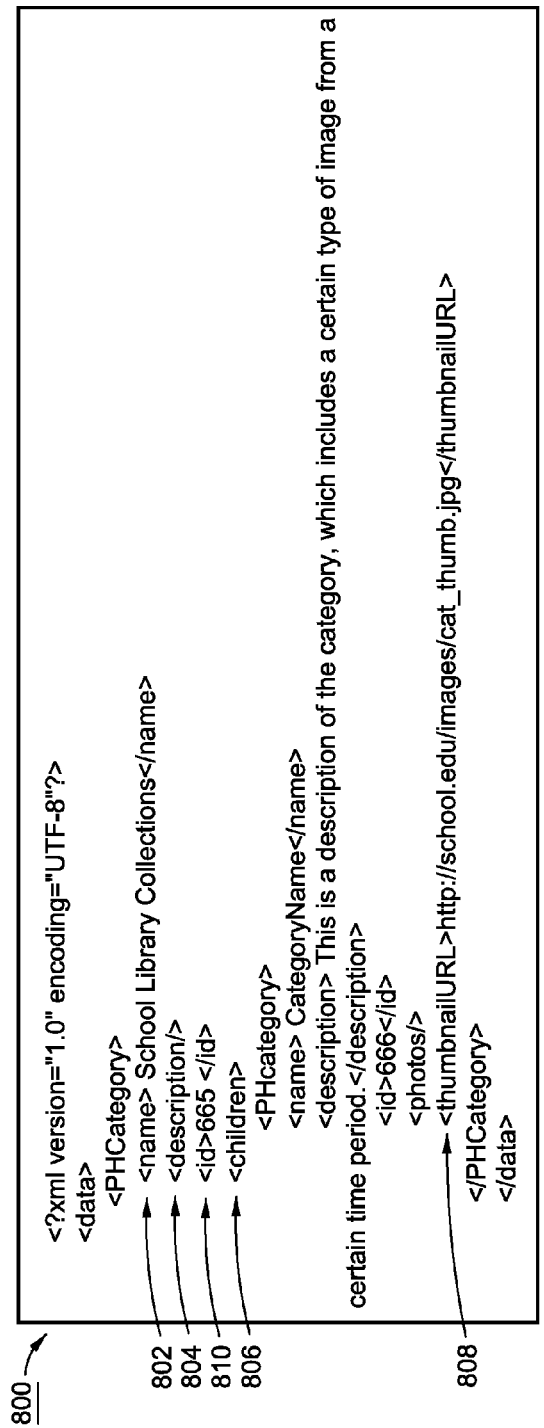
FIGS. 8A-8B are exemplary client-specific images data stored in a client-specific data file in the client-specific data store at the institutional client.
Figure 8B:
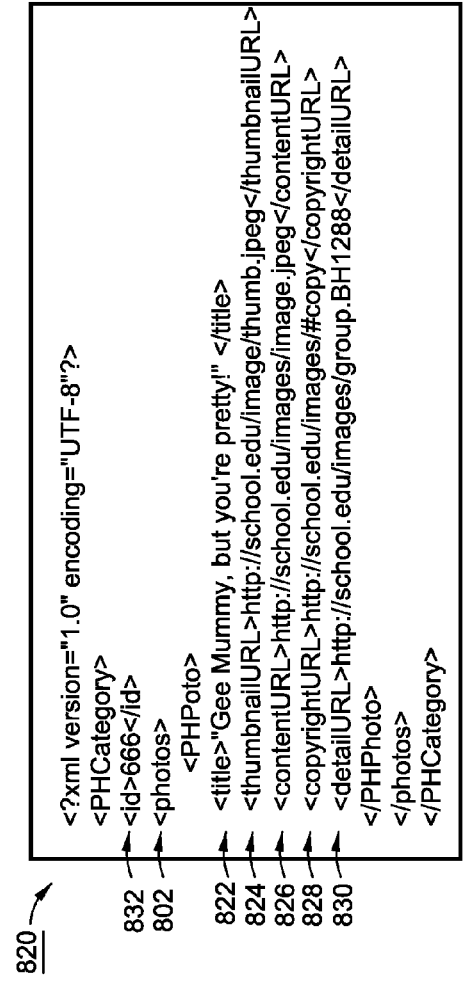

FIG. 8A shows exemplary client-specific images data 800, stored in a client-specific data file (e.g., in XML format) in the client-specific data store 130 at the institutional client 120, that provides target-type information including category names 802, category descriptions 804, category hierarchies 806, thumbnail URLs 808, and a unique identifier 810. FIG. 8B shows exemplary client-specific images data 820, stored in a client-specific data file (e.g., in XML format) in the client-specific data store 130 at the institutional client 120, that provide target-type information including image titles 822, image thumbnails 824, image content 826, image copyrights 828, image detail URLs 830, and a unique identifier 832. In certain embodiments, the client-specific images data 800 and 820 are made available by the institutional client 120, but may be located elsewhere, such as on a remote server as an RSS feed, as illustrated.

Figure 8E:
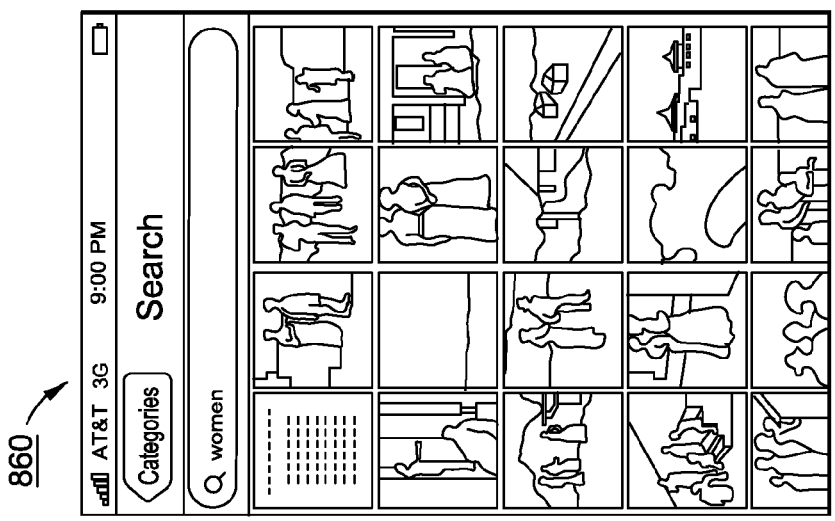
FIGS. 8C-8E are exemplary screenshots illustrating, in a mobile format, portions of extracted client-specific images data.
Figure 8D:
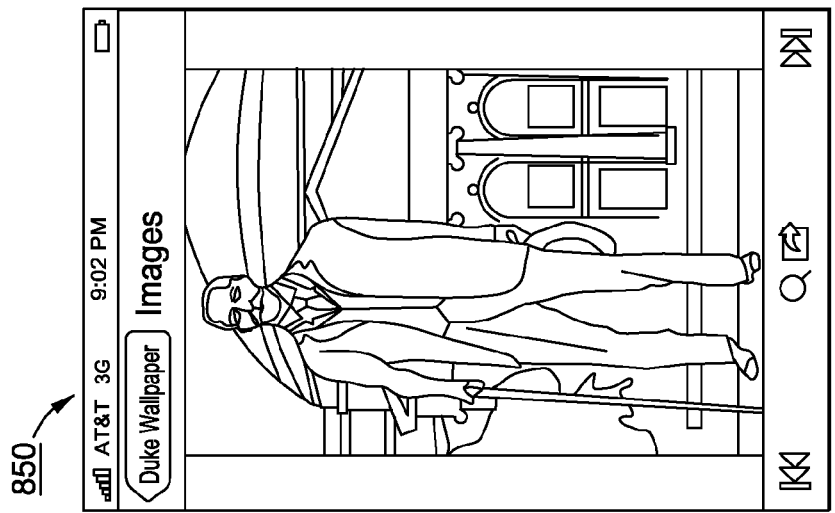
Figure 8C:
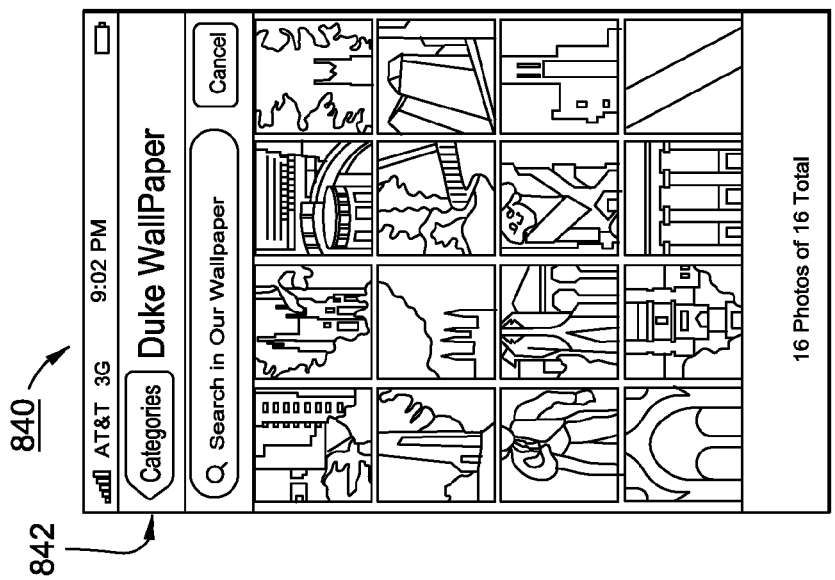

FIG. 8C is a screenshot 840 illustrating in a mobile format various images, in thumbnail format, of the client-specific news images in the "Duke Wallpaper" category 842 that were extracted in real-time from the client-specific content data store 130. FIG. 8D is a screenshot 850 illustrating in a mobile format a selected image from the various images displayed in FIG. 8C. FIG. 8E is a screenshot 860 illustrating in a mobile format an images search interface for the client-specific images data that was extracted in real-time from the client-specific content data store 130.

The system 100 is yet further configured to provide generalized mobile content based on client-specific directory data extracted from the client-specific content data store 130 according to the process 200 of FIG. 2. For example, the client-specific content data store 130 can be available on and extracted from a Lightweight Directory Access Protocol (LDAP) server. The system 100 accesses the LDAP directory using a URL address of the LDAP directory (e.g., ldap://ldap.school.edu) and a base domain name (e.g., cn=People, dc=School, and dc=EDU). The system 100 is configured to access and provide client-specific directory data that includes target data types, such as unique identifiers (e.g., indicated by the metatag 'uid'), attributes of a person displayed to the end user, such as a display name (e.g., indicated by the metatag 'display'), mailing address (e.g., indicated by the metatag 'mail'), email address (e.g., indicated by the metatag 'email'), fax number (e.g., indicated by the metatag 'fax'), and telephone number (e.g., indicated by the metatag 'phone'), and whether the directory entry has an equality index, substring index, or Soundex index.

In certain embodiments, the client-specific content data store 130 can be available via another type of directory web-service (e.g., other than LDAP) that provides a set of search results for a particular search query that consists of the name of all users (e.g., with their unique identifiers) that match a particular query. For example, FIG. 9A shows exemplary client-specific directory data 900 from a client-specific data file in the client-specific data store 130 at the institutional client 120, that is generated in response to the search query "Smith." FIG. 9B shows exemplary client-specific directory data 920 from a client-specific data file in the client-specific data store 130 at the institutional client 120, which is generated in response to the search query for a unique identifier for the directory entry associated with Ken Smith.

FIG. 9C is a screenshot 930 illustrating in a mobile format various directory entries that were extracted from the client-specific content data store 130 and stored in the generalized content data store 110 of the system 100. FIG. 9D is a screenshot 940 illustrating in a mobile format a first portion of a selected directory entry from the various directory entries displayed in FIG. 9C. The selected directory entry includes the entry's type 942 (e.g., student), affiliation 944 (e.g., academic department), mailing address 946, and email address 948. FIG. 9E is a screenshot 950 illustrating in a mobile format a second portion of the selected directory entry of FIG. 9D. A user viewing the entry is provided with the options of adding the entry information to the user's favorites 952, existing contacts 954, or as a new contact 956.

The system 100 is yet further configured to provide generalized mobile content based on client-specific courses data extracted from the client-specific content data store 130 according to the process 200 of FIG. 2. For example, the client-specific content data store 130 can include a database from which a client-specific course data file (e.g., an extract in comma separated or Excel format) for a course catalog from a course management system (e.g., PeopleSoft, Sunguard Banner, and Blackboard) can be retrieved. The client-specific course data file includes information on courses available from the institution.

In certain embodiments, the system 100 is configured to access and provide client-specific courses data that includes target data types, such as a department code (e.g., undergraduate), subject code (e.g., POL, indicating political science), term code (e.g., 1096, corresponding to Fall 2009), course title (e.g., "Philosophy of Religion"), course number (e.g., 101), day (e.g., Monday), start time (e.g., 12:30), end time (e.g., 13:30), start date, end date, session code (e.g., a unique identifier for a specific class), course type (e.g., lecture), instructor, location name (e.g., "McCosh"), location code (e.g., "mcsh01," corresponding to the code 310 value of the client-specific maps data discussed above), room, unit credit, enrollment capacity, and current enrolled total. In certain embodiments, the target data types for each course entry are included within a single row, and are provided as key-value pairs. The system 100 is also configured to provide extracted courses data information from the generalized content data store 110 to a mobile device in a format compatible to particular display characteristics associated with the courses, such as a grouping or individual display of related courses.

Figures 10A, 10B, 10C:
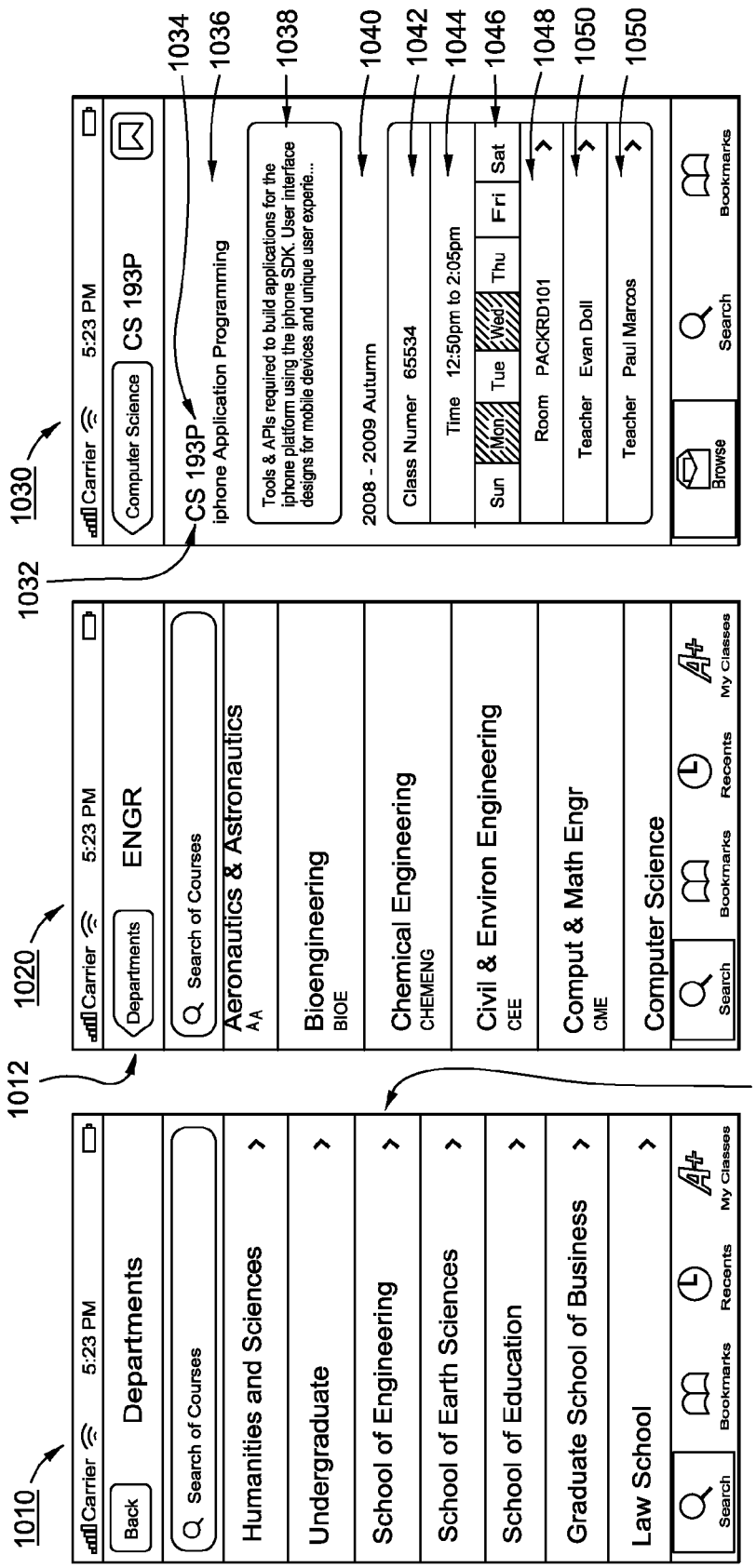
FIGS. 10A-10C are exemplary screenshots illustrating, in a mobile format, portions of extracted client-specific courses data.

FIG. 10A is a screenshot 1010 illustrating in a mobile format various schools of an institution that were extracted from the client-specific courses data from the client-specific content data store 130 and stored in the generalized content data store 110 of the system 100, including the School of Engineering 1012. FIG. 10B is a screenshot 1020 illustrating in a mobile format various departments of the School of Engineering 1012 of FIG. 10A. FIG. 10C is a screenshot 1030 illustrating, in a mobile format, information, on a selected course, extracted from the client-specific content data store 130 and stored in the generalized content data store 110 of the system 100. The information includes a course code 1032, course number 1034, course title 1036, course description 1038, course term 1040, session code 1042, course time 1044, course days 1046, course room 1048, and course instructors 1050.

Figure 11:
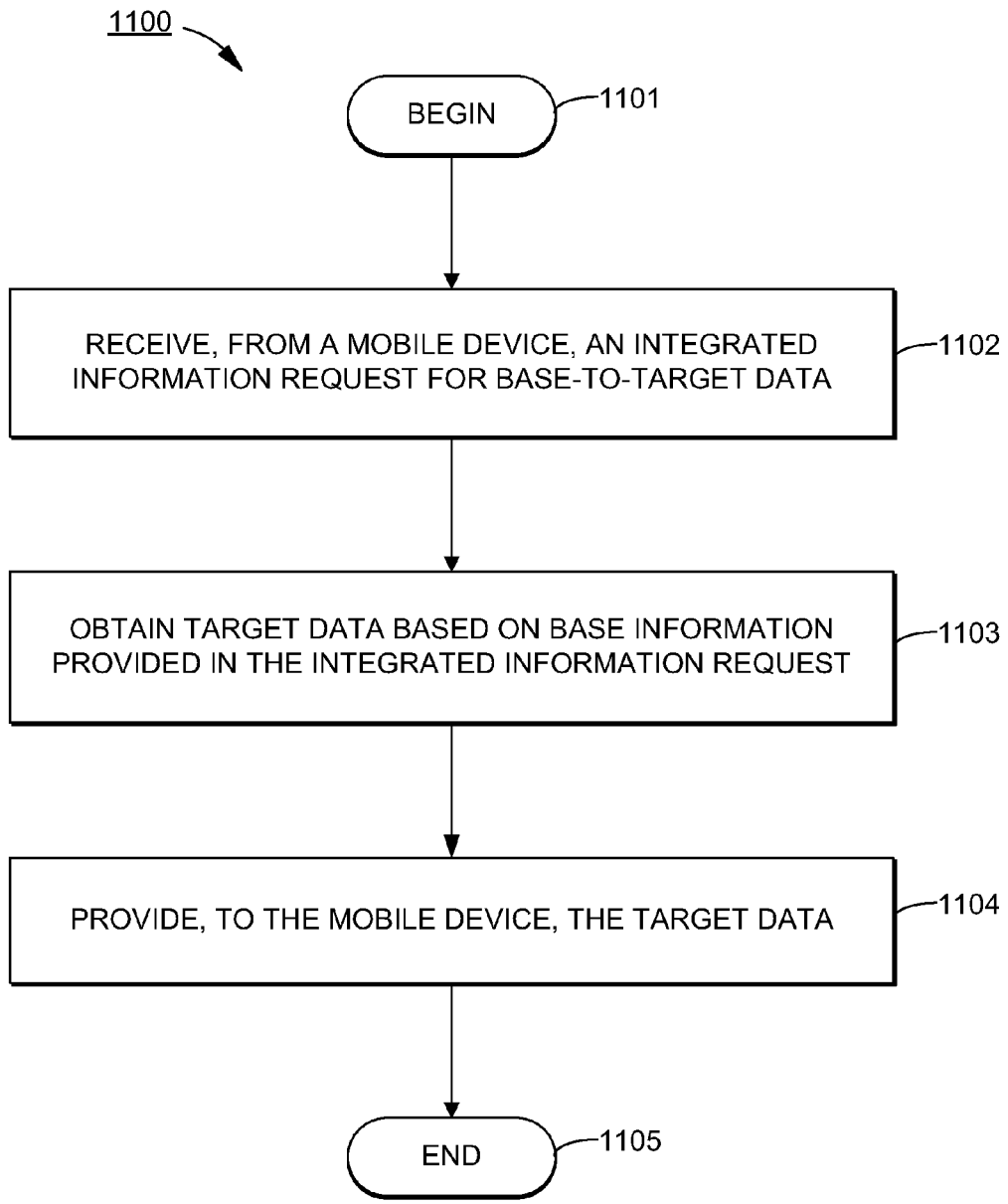
FIG. 11 is a flow chart illustrating an exemplary process for processing an integrated information request from a mobile device.

FIG. 11 is a flow chart illustrating an exemplary process 1100 for processing an integrated information request from a mobile device 132 using the mobile delivery system for institutional content 100 of FIG. 1. The process 1100 proceeds from beginning step 1101 to step 1102, in which an integrated information request for base-to-target data is received from the mobile device 132. In step 1103, the system 100 obtains target data (e.g., from generalized content data store 110) based on the base (or "source") information provided in the integrated information request. In step 1104, the target data is provided to the mobile device 132. The process 1100 ends in step 1105.

Having set forth in FIG. 11 a process 1100 for processing an integrated information request from a mobile device 132 using the mobile delivery system for institutional content 100 of FIG. 1, an example will now be presented using the process 1100 of FIG. 11 and an integrated information request for client-specific map data. FIG. 12A illustrates exemplary source code 1210 (or an "integration hook") for steps from the process 1100 of FIG. 11. The process 1100 proceeds from beginning step 1101 to step 1102, in which an integrated information request for base-to-target data, course-to-map data, is received from the mobile device 132. The request is initiated from the course information screen 1220 illustrated in FIG. 12B, wherein a user has requested to see the location of the course 1224 on a map. In certain embodiments, the ability to submit an integrated information request for target data is indicated by a right arrow 1222. Thus, a user seeking additional information on the location "RH 203" 1224 can click on the arrow 1222 associated with the location on the screen 1220. In step 1103, the system 100 obtains the target map data (e.g., from generalized content data store 110) based on the base information, the building identification, provided in the integrated information request. In step 1104, the target data, a map and the location of the building for location "RH 203" (i.e., "Dave C. Reed Hall") on the map, is provided to the mobile device 132, as illustrated in FIG. 12C. The process 1100 ends in step 1105.

Another example will now also be presented using the process 1100 of FIG. 11 and an integrated information request for client-specific directory data. FIG. 13A illustrates exemplary source code 1310 for steps from the process 1100 of FIG. 11. The process 1100 proceeds from beginning step 1101 to step 1102, in which an integrated information request for base-to-target data, course-to-directory data, is received from the mobile device 132. The request is initiated from the course information screen 1320 illustrated in FIG. 13B, wherein a user has requested to see information on instructor Mary McKinney 1322. In step 1103, the system 100 obtains the target directory data (e.g., from generalized content data store 110) based on the base information, the instructor's identification, provided in the integrated information request. In step 1104, the target data, a directory listing for the instructor, is provided to the mobile device 132, as illustrated in FIG. 13C. The process 1100 ends in step 1105.

Although the examples for the processing of an integrated information request from the mobile device 132 using the mobile delivery system 100 of FIG. 1 disclose two types of integrated information requests, the system 100 is configured to process various types of integrated information requests using at least the various types of client-specific data disclosed above. For example, the system 100 is configured to process an integrated information request in which target directory data is requested based on event data, such as where when an event listing includes information on a contact person, and a user clicks on that information, the system 100 returns the directory detail of the contact person. As another example, the system 100 is configured to process an integrated information request in which target maps data is requested based on event data, such as where when an event listing includes information on a location, and a user clicks on that information, the system 100 returns the location (e.g., indicated by a pin drop) of that event on a map. As yet another example, the system 100 is configured to process an integrated information request in which target maps data is requested based on directory data, such as where when a directory listing includes information on a location of the person (e.g., their office address), and a user clicks on that information, the system 100 returns the location (e.g., indicated by a pin drop) of that person on a map. As a further example, the system 100 is configured to process an integrated information request in which target maps data is requested based on dining place data, such as where when a dining place includes information on the dining place's location, and a user clicks on that information, the system 100 returns the location (e.g., indicated by a pin drop) of that dining place on a map. As another example, the system 100 is configured to process an integrated information request in which target maps data is requested based on library data, such as where when a user searches for a book in a library that includes information on the library's location (or the location of the book in the library), and a user clicks on that information, the system 100 returns the location (e.g., indicated by a pin drop) of the library (or the book in the library) on a map.

Figure 14:
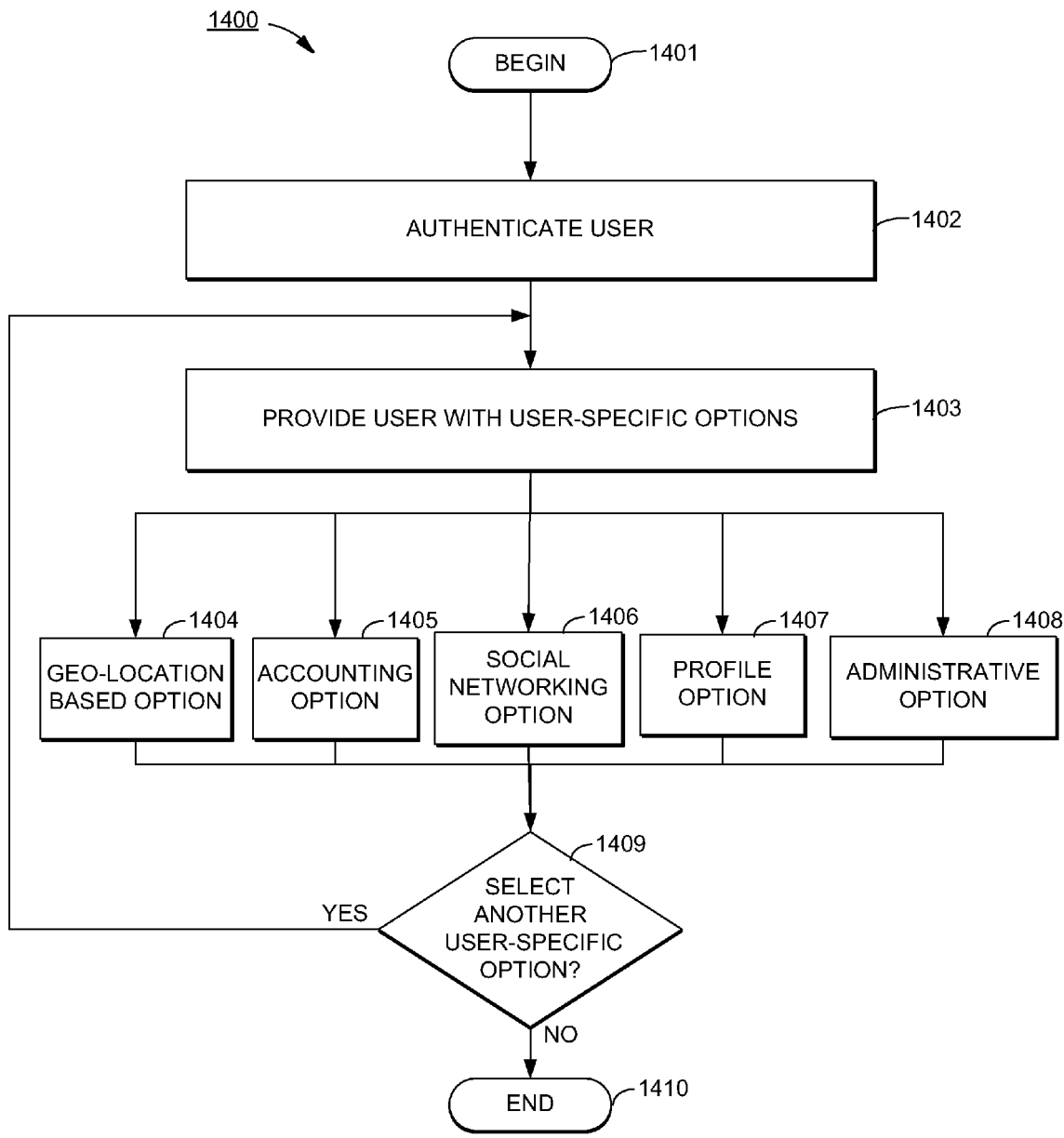
FIG. 14 is a flow chart illustrating an exemplary process for providing a user with user-specific options for viewing mobile content.

FIG. 14 is a flow chart illustrating an exemplary process 1400 for providing a user with user-specific options for viewing mobile content. The process 1400 proceeds from beginning step 1401 to step 1402 in which the user is authenticated. The user may be authenticated using information such as a username and password associated with the user's account on the system 100. Next, in step 1403, the user is provided with user-specific options, which include a geo-location based option (e.g., location of the user on a map) processed in step 1404, an accounting option (e.g., view outstanding balances) processed in step 1405, a social networking option (e.g., view selected information from social networking sites) processed in step 1406, a profile option (e.g., view class grades) processed in step 1407, and an administrative option (e.g., user name and password changes) processed in step 1408. After the user has completed the user-specific option of steps 1404-1408, the process 1400 proceeds to decision step 1409 in which, if the user chooses to selects another user-specific option, the process 1400 returns to step 1403, otherwise the process 1400 ends in step 1410. In certain embodiments, at least two of these user-specific options can be used concurrently, as described in the examples below.

Figure 15B:
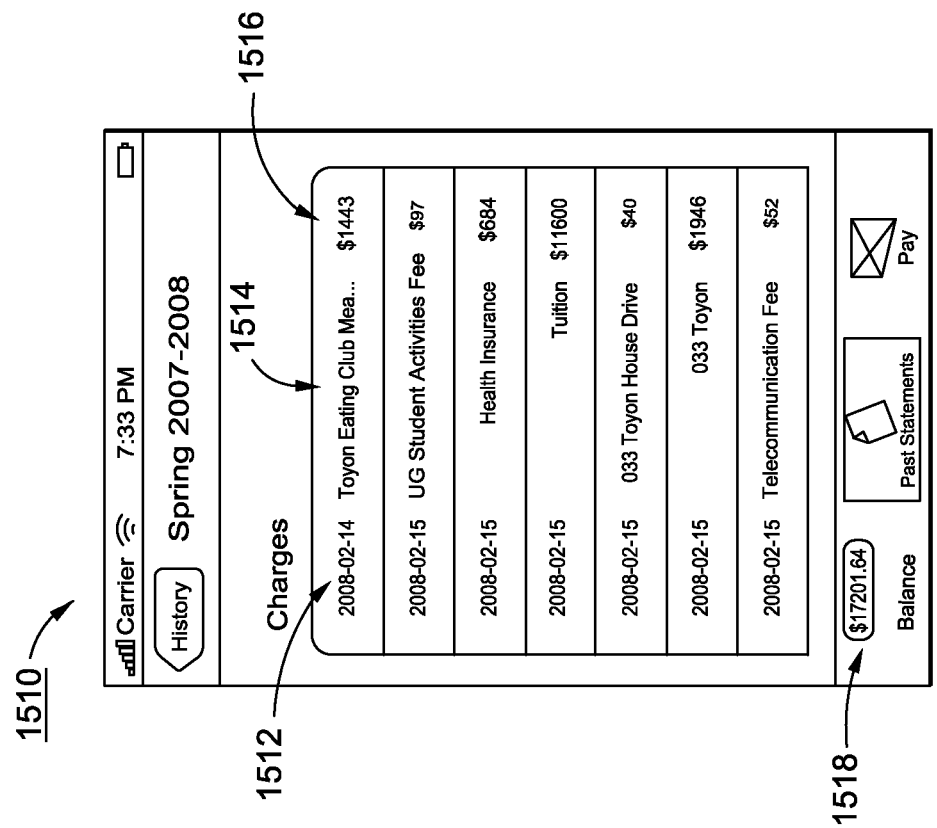
Figure 15A:
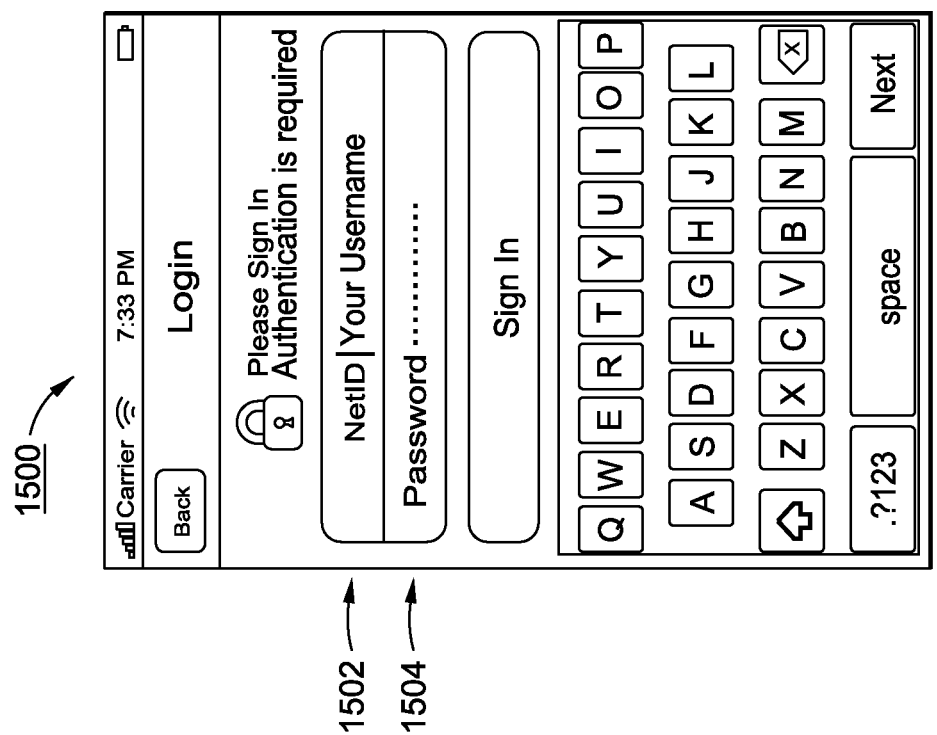
FIG. 15A is an exemplary screenshot illustrating, in a mobile format, a user authentication screen.

Having set forth in FIG. 14 a process 1400 for providing a user with user-specific options for viewing mobile content using the mobile delivery system for institutional content 100 of FIG. 1, an example will now be presented using the process 1400 of FIG. 14 and the accounting option of step 1405. The process 1400 proceeds from beginning step 1401 to step 1402 in which the user is authenticated. FIG. 15A is an exemplary screenshot 1500 illustrating, in a mobile format, a user authentication screen wherein a user provides his username 1502 and password 1504 to the system 100. For example, in certain embodiments, the user authentication information that is provided may mirror the user's authentication information associated with his university, such as by using the user's university email address and associated password for the authentication. The system 100, upon receiving this authentication information from the user at the user's mobile device 132, can then provide this authentication information to the university system, such as over an encrypted connection. If the authentication information is accepted, the user can proceed. If, however, the authentication information is not accepted (e.g., it is incorrect, invalid, or expired), then the user may be given another opportunity to provide authentication information, or may be denied access. Next, in step 1403, the user is provided with user-specific options, from which the user selects the accounting option processed in step 1405. FIG. 15B in an exemplary screenshot 1510 illustrating, in a mobile format, the user's charges associated with his Spring 2007-2008 semester at his university. The displayed information includes a date 1512 for each charge, a description 1514 of each charge, an amount 1516 of each charge, and a total balance 1518 associated with the user's account. The user may view charges associated with other semesters at the university, as in FIG. 15C, an exemplary screenshot 1520 illustrating, in a mobile format, the user's charges associated with his Autumn 2008-2009 semester 1522, Summer 2007-2008 semester 1524, and Spring 2007-2008 semester 1526, along with associated balances 1528. The user's charges are for past statements 1530; current statements may also be viewed (not illustrated). The user also has an option to pay 1532 for the charges associated with his user account. For example, the user can associate his user account on the system 100 with his bank account or credit card, and then pay outstanding balances using the bank account or credit card. After the user has completed the user-specific accounting option 1405, the user chooses to select another user-specific option in decision step 1409, and the process 1400 returns to step 1403, from which the user selects the user-specific profile option 1407. FIG. 15D is an exemplary screenshot 1530 illustrating, in a mobile format, the user's course history for the Winter 2007-2008 semester. The displayed information includes, for each course, a subject code 1532, course number 1534, course title 1536, grade 1538, grade type 1540, course type 1542, and unit credit 1544. After the user has completed the user-specific profile option of step 1407, the user chooses not to select another user-specific option in decision step 1409, and the process 1400 then ends in step 1410.

The user-specific geo-location based option of step 1404 allows a user to interact with the system 100 based on the user's geographic location. The user's geographic location can be obtained in various ways, including cellular phone triangulation or a GPS signal associated with the mobile device 132. One exemplary user-specific geo-location use is to identify the location of the user on a map of the institution along with a point of interest of the user, such as where a course is offered as illustrated in FIG. 3D. In certain embodiments, the system 100 can then provide transportation data (e.g., directions for driving, walking, or by public transportation) to the point of interest. Another exemplary use is, in an emergency situation, a user having an administrator role in the system 100 being able to view the locations of all users in the system 100 on a map of the institution. In this use, the administrator may view the map on a mobile or non-mobile device, while data on the location of the users is provided by their mobile devices 132.

The user-specific social networking option 1406 allows a user to interact with the system 100 based on the user's social networks (e.g., Facebook®, Twitter®, MySpace®, LinkedIn®). For example, a user may provide his social network identification information (e.g., Facebook login) to the system 100. The user's social network may identify a number of associates (e.g., 1000 Facebook friends), a subset of which (e.g., 100 friends) are registered with the system. A subset of those associates (e.g., 10 friends) who are currently providing their geo-location (e.g., are using a GPS-enabled mobile device 132 connected to the system 100) can then be highlighted on a map on the user's mobile device (e.g., pinpoints of a first color on a map of the institution that identify the user's 10 friends, and a pinpoint of a second color on the map that identify the user).

As another example, when a user registers for a class from his mobile device 132 using the system 100, the system 100 may publish to the user's Twitter feed (or a Twitter feed associated with the class) that the user has registered for the class (e.g., "John has registered for CS 103A") for viewing by the user's Twitter followers or other classmates who follow the Twitter feed for the class. As yet another example, a user at an educational institution can view Twitter feeds for athletics teams of the educational institution. As a further example, a user of the system 100 can locate other students (e.g., friends from Facebook® or MySpace®) registered with the system 100 who are enrolled in the same or related courses as the user. As yet another example, a user of the system 100 who desires to review a homework assignment or study for an examination for a class with her nearby friends in the class can use the system 100 to locate her friends (e.g., friends from Facebook® or MySpace®) who are in a nearby geographical location according to those friends' mobile devices 132. Her friends, who are also registered with the system 100, are identified by the system 100 as both being in the same class, and her friends (e.g., by their Facebook® or MySpace® information provided to the system 100). As another example, a user of the system 100 can locate nearby friends (e.g., friends from Facebook® or MySpace®) who are in a nearby geographical location according to those friends' mobile devices 132 and arrange a game of basketball.

As a further example, a user of the system 100 can send a message (e.g., an instant message) to another user of the system 100 that includes a course droplet configured to allow the other user to register for the course. As yet another example, the system 100 can identify a user's associated dining plan, and then, based on the user's current location, identify nearby dining halls that accepts the user's dining plan. As another example, the user-specific options presented to the user allow the user to connect and interact with a learning management system with which the user has a user account, such as the learning management systems disclosed in U.S. Pat. Nos. 6,988,138, 7,493,396, and 7,558,853, and U.S. patent application Ser. No. 12/470,739, filed May 22, 2009, which are incorporated herein by reference in their entirety. For example, a user having an instructor role in the learning management system interacting with the disclosed system 100 can update schedule data for a course associated with the instructor. As another example, a user of the system 100 having a student role and searching for a tutor can locate users having a teaching assistant role in the desired subject area.

As another example, the user-specific options presented to the user allow the user to connect and interact with transaction control systems, such as the electronic transactions system disclosed in U.S. patent application Ser. No. 12/476,136 filed Jun. 1, 2009, which is incorporated herein by reference in its entirety. For example, a user from her mobile device 132 can gain access to a restricted access area using the system 100, connected to the electronic transactions system over the network 118, if her user-account includes the appropriate user-access privileges.

Figure 16B:
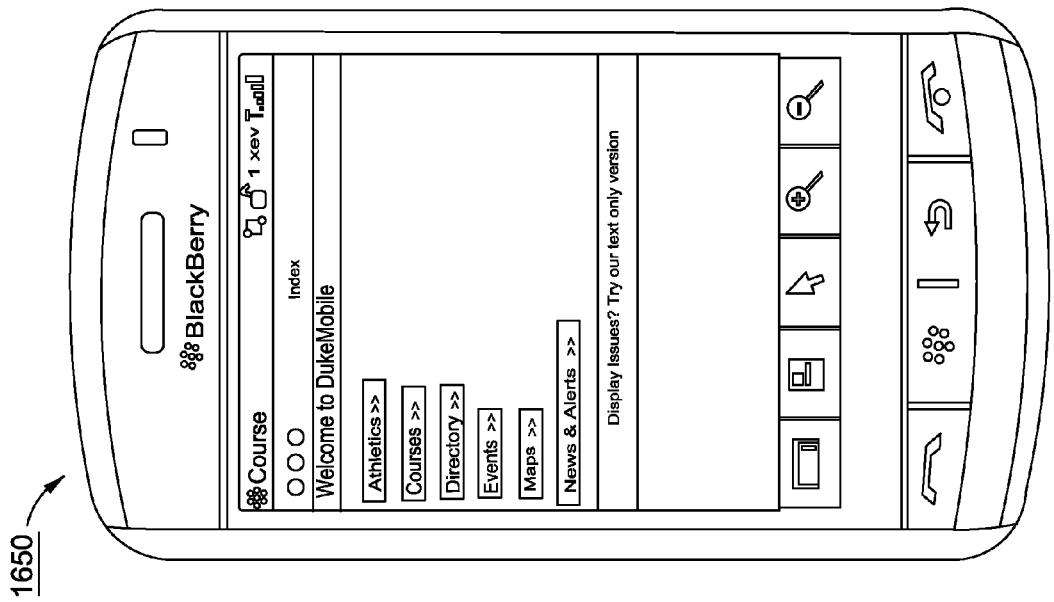
FIGS. 16A-16B are exemplary screenshots illustrating institutional content configured for different mobile devices.
Figure 16A:
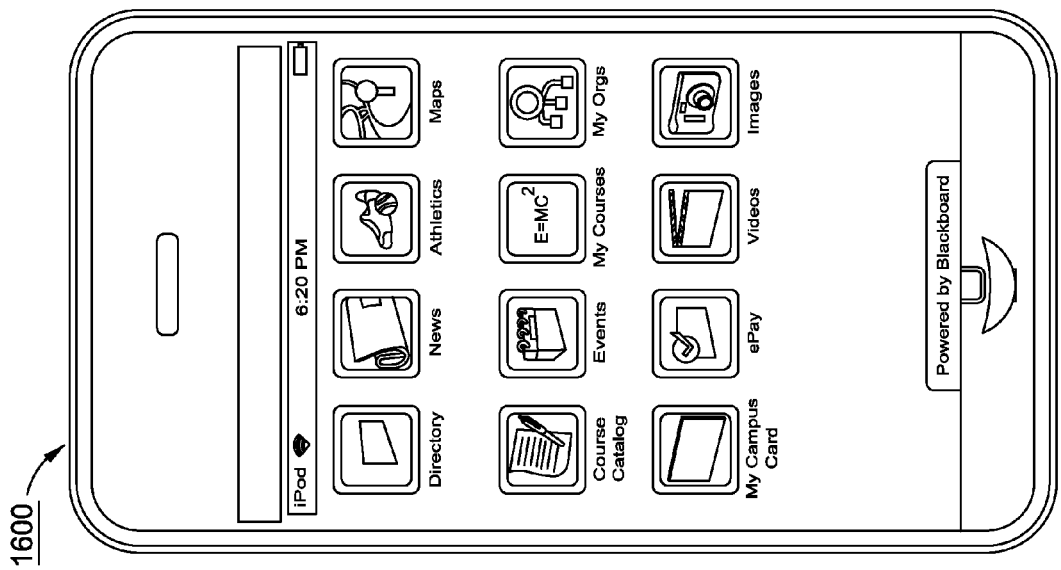

FIGS. 16A-16B are exemplary screenshots illustrating institutional content configured for different mobile devices. FIG. 16A is an image 1600 illustrating a graphical user interface to the system 100 configured for a mobile device 132, specifically, an Apple iPhone®. FIG. 16B is an image 1650 illustrating a textual user interface to the system 100 configured for generic mobile devices 132, such a Blackberry Storm®. The mobile device user interface to the system 100 is configured to be modular, and is further configured to be customized to the needs of the institutional client 120.

Figure 17:
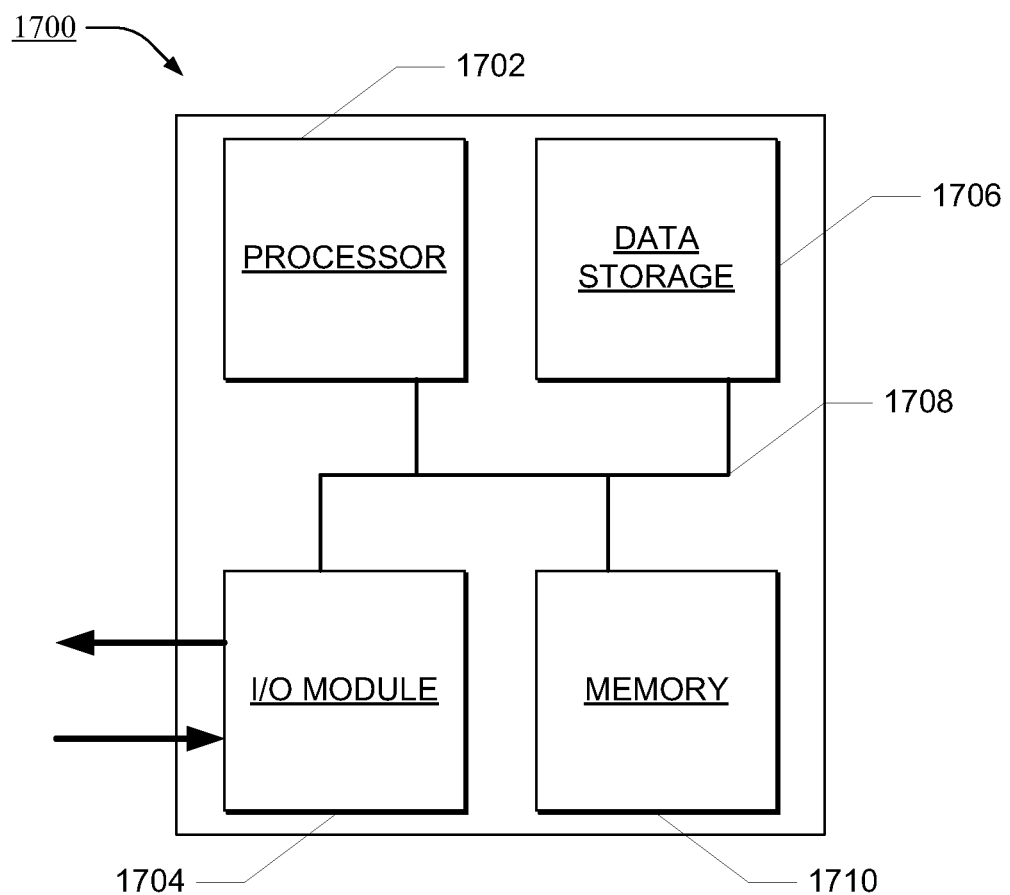
FIG. 17 is a block diagram illustrating an example of a computer system with which the mobile delivery system for institutional content of FIG. 1 can be implemented.

FIG. 17 is a block diagram illustrating an example of a computer system with which the mobile delivery system 100 for institutional content of FIG. 1 can be implemented. In certain embodiments, the computer system 1700 may be implemented using software, hardware, or a combination of both, either in a dedicated server, or integrated into another entity, or distributed across multiple entities.

Computer system 1700 (e.g., system 100) includes a bus 1708 (e.g., communications bus 104 from FIG. 1) or other communication mechanism for communicating information, and a processor 1702 (e.g., processor 102 from FIG. 1) coupled with bus 1708 for processing information. By way of example, the computer system 1700 may be implemented with one or more processors 1702. Processor 1702 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information. Computer system 1700 also includes a memory 1710 (e.g., memory 108 from FIG. 1), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 1708 for storing information and instructions to be executed by processor 1702. The instructions may be implemented according to any method well known to those of skill in the art, including, but not limited to, computer languages such as data-oriented languages (e.g., SQL, dBase), system languages (e.g., C, C++, Assembly), architectural languages (e.g., Java), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 1710 may also be used for storing temporary variable or other intermediate information during execution of instructions to be executed by processor 1702. Computer system 1700 further includes a data storage device 1706, such as a magnetic disk or optical disk, coupled to bus 1708 for storing information and instructions.

Computer system 1700 may be coupled via I/O module 1704 to a display device, such as a CRT or LCD for displaying information to a computer user. An input device, such as, for example, a keyboard, or a mouse may also be coupled to computer system 1700 via I/O module 1704 for communicating information and command selections to processor 1702.

According to one aspect of the present disclosure, a mobile delivery system for institutional content 100 can be implemented using a computer system 1700 in response to processor 1702 executing one or more sequences of one or more instructions contained in memory 1710. Such instructions may be read into memory 1710 from another machine-readable medium, such as data storage device 1706. Execution of the sequences of instructions contained in main memory 1710 causes processor 1702 to perform the process steps described herein. One or more processors in a multi-processing arrangement may also be employed to execute the sequences of instructions contained in memory 1710. In alternative embodiments, hard-wired circuitry may be used in place of or in combination with software instructions to implement various embodiments of the present disclosure. Thus, embodiments of the present disclosure are not limited to any specific combination of hardware circuitry and software.

The term "machine-readable medium" as used herein refers to any medium or media that participates in providing instructions to processor 1702 for execution. Such a medium may take many forms, including, but not limited to, non-volatile media, volatile media, and transmission media. Non-volatile media include, for example, optical or magnetic disks, such as data storage device 1706. Volatile media include dynamic memory, such as memory 1706. Transmission media include coaxial cables, copper wire, and fiber optics, including the wires that comprise bus 1708. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

The embodiments of the present disclosure provide a system that generalizes client-specific content, and stores the generalized content in memory for delivery, in a mobile-compatible format, to a mobile device. The system provides a convenient interface for integrated requests from the mobile device for target generalized content from a base mobile content page. The system yet further provides user-specific content formatted for mobile devices based on the generalized content that is extracted from an institutional client. Thus, a user can use his web-enabled cellular telephone to interact with various integrated applications related to his educational institution, such as instantly seeing the location of his friends on campus, finding out which classes he shares with those friends, where the classes are located vis-à-vis his current position, the details of the instructors teaching the classes, his scores in the classes, and viewing previous lectures from the classes.

Those of skill in the art would appreciate that the various illustrative blocks, modules, elements, components, methods, and algorithms described herein may be implemented as electronic hardware, computer software, or combinations of both. Furthermore, these may be partitioned differently than what is described. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application.

It is understood that the specific order or hierarchy of steps or blocks in the processes disclosed is an illustration of exemplary approaches. Based upon design preferences, it is understood that the specific order or hierarchy of steps or blocks in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

While certain aspects and embodiments of the invention have been described, these have been presented by way of example only, and are not intended to limit the scope of the invention. Indeed, the novel methods and systems described herein may be embodied in a variety of other forms without departing from the spirit thereof. The accompanying claims and their equivalents are intended to cover such forms or modifications as would fall within the scope and spirit of the invention.

What is claimed is:

1. A system for generalizing the format of instructional content for mobile delivery, comprising:
    a processor configured to identify institutional content in a client-specific data file by parsing through the client-specific data file to identify specific data types indicated by at least one of at least one tag for the specific data types or a storage format for the specific data types in order to extract client specific data matching the specific data types, the specific data types indicated by the at least one tag or the storage format comprising institutional map data, institutional news data, institutional athletics data, institutional events data, institutional directory data, or institutional courses data, and further configured to store, in a memory, the identified institutional content as generalized institutional content configurable for display on a plurality of device types; and
    a communications module configured to receive, from a mobile device, a request for the generalized institutional content,
    wherein the processor is configured to provide, to the mobile device in response to the request, the generalized institutional content in a format configured for display on the mobile device.

2. The system of claim 1, wherein the storage format of the generalized institutional content comprises a comma separated format, a SQL-extract, text file, XML feed, RSS feed, Microsoft Excel® file, or Microsoft Word® file.

3. The system of claim 1, wherein the data type further comprises at least one of institutional videos data or institutional images data.

4. The system of claim 1, wherein the institutional content comprises content for at least one of an educational institution, government institution, or corporate institution.

5. The system of claim 1, wherein the client-specific data file comprises a web feed format and a database format.

6. The system of claim 1, wherein the processor is configured to identify the institutional content in the client-specific data file based on the request for the generalized institutional content from the mobile device.

7. The system of claim 1, wherein the processor is configured to identify the institutional content in the client-specific data file based on a predetermined schedule.

8. The system of claim 1, wherein the generalized institutional content is stored in the memory in a platform-independent format.

9. The system of claim 1, wherein the generalized institutional content is provided to an application on the mobile device configured to display the generalized institutional content in a format configured for display on the mobile device based on the type of the mobile device.

10. A method for generalizing the format of instructional content for mobile delivery, comprising:
    identifying institutional content in a client-specific data file by parsing through the client-specific data file to identify specific data types indicated by at least one of at least one tag for the specific data types or a storage format for the specific data types in order to extract client specific data matching the specific data types, the specific data types indicated by the at least one tag or the storage format comprising institutional map data, institutional news data, institutional athletics data, institutional events data, institutional directory data, or institutional courses data;
    storing, in a memory, the identified institutional content as generalized institutional content configurable for display on a plurality of device types;
    receiving, from a mobile device, a request for the generalized institutional content; and
    providing, to the mobile device in response to the request, the generalized institutional content in a format configured for display on the mobile device.

11. The method of claim 10, wherein the storage format comprises a comma separated format, a SQL-extract, text file, XML feed, RSS feed, Microsoft Excel® file, or Microsoft Word® file.

12. The method of claim 10, wherein the data type comprises at least one of institutional videos data or institutional images data.

13. The method of claim 10, wherein the institutional content comprises content for at least one of an educational institution, government institution, or corporate institution.

14. The method of claim 10, wherein the client-specific data file comprises a web feed format and a database format.

15. The method of claim 10, wherein the identification of the institutional content in the client-specific data file is based on the request for the generalized institutional content from the mobile device.

16. The method of claim 10, wherein the identification of the institutional content in the client-specific data file and storage of the generalized institutional content is based on a predetermined schedule.

17. The method of claim 10, wherein the generalized institutional content is stored in the memory in a platform-independent format.

18. The method of claim 10, wherein the generalized institutional content is provided to an application on the mobile device configured to display the generalized institutional content in a format configured for display on the mobile device based on the type of the mobile device.

19. A non-transitory computer-readable medium having computer-executable instructions for causing a processor to execute instructions to generalize the format of instructional content for mobile delivery by performing steps comprising:
    identifying institutional content in a client-specific data file by parsing through the client-specific data file to identify specific data types indicated by at least one of at least one tag for the specific data types or a storage format for the specific data types in order to extract client specific data matching the specific data types, the specific data types indicated by the at least one tag or the storage format comprising institutional map data, institutional news data, institutional athletics data, institutional events data, institutional directory data, or institutional courses data;

storing, in a memory, the identified institutional content as generalized institutional content configurable for display on a plurality of device types;

receiving, from a mobile device, a request for the generalized institutional content; and providing, to the mobile device in response to the request, the generalized institutional content in a format configured for display on the mobile device.

* * * * *